United States Patent
Jiang et al.

(10) Patent No.: US 11,190,975 B2
(45) Date of Patent: Nov. 30, 2021

(54) FEEDBACK TECHNIQUES FOR WIRELESS COMMUNICATIONS

(71) Applicant: QUALCOMM Incorporated, San Diego, CA (US)

(72) Inventors: Jing Jiang, San Diego, CA (US); Seyedkianoush Hosseini, San Diego, CA (US); Huang Lou, San Diego, CA (US); Joseph Binamira Soriaga, San Diego, CA (US); Hari Sankar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 114 days.

(21) Appl. No.: 15/713,335

(22) Filed: Sep. 22, 2017

(65) Prior Publication Data

US 2018/0234880 A1    Aug. 16, 2018

Related U.S. Application Data

(60) Provisional application No. 62/458,568, filed on Feb. 13, 2017.

(51) Int. Cl.
*H04W 28/04*    (2009.01)
*H04L 1/18*    (2006.01)
(Continued)

(52) U.S. Cl.
CPC .......... *H04W 28/04* (2013.01); *H04L 1/0045* (2013.01); *H04L 1/1607* (2013.01);
(Continued)

(58) Field of Classification Search
None
See application file for complete search history.

(56) References Cited

U.S. PATENT DOCUMENTS

| 2008/0310338 A1 | 12/2008 | Charpenter et al. |
| 2013/0223485 A1 | 8/2013 | Bai et al. |
| 2013/0223536 A1 | 8/2013 | Zhang |

(Continued)

FOREIGN PATENT DOCUMENTS

| CN | 101636938 A | 1/2010 |
| TW | 201607346 A | 2/2016 |

OTHER PUBLICATIONS

CATT: "Discussion on HARQ Enhancements for NR", 3GPP Draft; R1-1702101, 3rd Generation Partnership Project (3GPP), Mobile Competence Centre: 650, Route Des Lucioles; F-06921 Sophia-Antipolis Cedex; France, vol. Ran WG1, No. Athens, Greece; Feb. 13, 2017-Feb. 17, 2017 Feb. 12, 2017, XP051209262, Retrieved from the Internet: URL:http://www.3gpp.org/ftp/Meetings_3GPP_SYNC/RAN1/Docs/ [retrieved on Feb. 12, 2017], 3 pages.

(Continued)

*Primary Examiner* — Scott M Sciacca
(74) *Attorney, Agent, or Firm* — Holland & Hart LLP

(57) ABSTRACT

Methods, systems, and devices for wireless communication are described that provide for generation of an encoded transport block (TB) that includes a number of systematic code blocks (CBs) and a number of parity CBs. The systematic CBs may be transmitted to a receiver, and the receiver may attempt to decode the systematic CBs. In some cases, one or more parity CBs may be transmitted with the systematic CBs, and the systematic CBs may be successfully decoded even in the event that one or more of the systematic CBs are not successfully received. In some cases, a receiver may provide feedback that requests that additional CBs be transmitted to decode the systematic CBs that were received, and it is not necessary to retransmit the missing systematic CBs. In some cases, a quantized value of a number of additional CBs needed to decode the TB may be transmitted.

24 Claims, 23 Drawing Sheets

(51) Int. Cl.
*H04L 1/16* (2006.01)
*H04L 1/00* (2006.01)
(52) U.S. Cl.
CPC .......... *H04L 1/1671* (2013.01); *H04L 1/1812* (2013.01); *H04L 1/1864* (2013.01); *H04L 1/1887* (2013.01); *H04L 1/1896* (2013.01)

(56) References Cited

U.S. PATENT DOCUMENTS

| 2016/0285589 | A1* | 9/2016 | Mukkavilli | H04L 1/0009 |
|---|---|---|---|---|
| 2017/0223675 | A1* | 8/2017 | Dinan | H04W 72/042 |
| 2018/0048421 | A1* | 2/2018 | Yeo | H04L 1/0046 |
| 2018/0145797 | A1* | 5/2018 | Yeo | H04L 1/1812 |
| 2018/0159660 | A1* | 6/2018 | Jia | H04L 1/0064 |
| 2018/0167171 | A1* | 6/2018 | Wu | H04L 1/18 |
| 2019/0068318 | A1* | 2/2019 | Marinier | H04L 1/0065 |
| 2019/0165882 | A1* | 5/2019 | You | H04W 72/0453 |
| 2019/0165893 | A1* | 5/2019 | Khosravirad | H04L 1/0001 |
| 2019/0190654 | A1* | 6/2019 | You | H04L 1/0065 |
| 2019/0229751 | A1* | 7/2019 | Kim | H03M 13/11 |
| 2020/0014491 | A1* | 1/2020 | Takeda | H04L 5/0082 |
| 2020/0068544 | A1* | 2/2020 | Xue | H04W 72/044 |

OTHER PUBLICATIONS

International Search Report and Written Opinion—PCT/US2018/015229—ISA/EPO—Apr. 19, 2018.

Qualcomm Incorporated: "Multi-Bit HARQ-ACK Feedback", 3GPP Draft; R1-1702636 Multi-Bit HARQ-ACK Feedb Ack, 3rd Generation Partnership Project (3GPP), Mobile Competence Centre; 650, Route Des Lucioles: F-06921 Sophia-Antipolis Cedex: France, vol. Ran WG1, No. Athens, Greece; Feb. 13, 2017-Feb. 17, 2017, Feb. 7, 2017, XP051221491, Retrieved from the Internet: URL:http://www.3gpp.org/ftp/tsg_ran/WG1_RL1/TSGR1_88/Docs/ [retrieved on Feb. 7, 2017], 9 pages.

Qualcomm Incorporated: "Outer Code Design for URLLC and eMBB Multiplexing", 3GPP Draft; R1-1702641 Outer Code Design for URLLC and eMBB Multiplexing, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 13, 2017-Feb. 17, 2017, Feb. 12, 2017, XP051209792, Retrieved from the Internet: URL:http://www.3gpp.org/ftp/Meetings_3GPP_SYNC/RAN1/Docs/ [retrieved on Feb. 12, 2017], 10 pages.

Qualcomm Incorporated: "UCI Content", 3GPP Draft; R1-1612072, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 14, 2016-Nov. 18, 2016, Nov. 13, 2016 (Nov. 13, 2016), XP051176032, pp. 1-3, Retrieved from the Internet: URL:http://www.3gpp.org/ftp/Meetings_3GPP_SYNC/RAN1/Docs/ [retrieved on Nov. 13, 2016].

Taiwan Search Report—TW107102659—TIPO—dated Sep. 15, 2021.

* cited by examiner

FEEDBACK TECHNIQUES FOR WIRELESS COMMUNICATIONS

CROSS REFERENCES

The present application for patent claims priority to U.S. Provisional Patent Application No. 62/458,568 by Jiang, et al., entitled "Feedback Techniques For Wireless Communications," filed Feb. 13, 2017, assigned to the assignee hereof, and which is hereby expressly incorporated by reference herein in its entirety.

BACKGROUND

The following relates generally to wireless communication, and more specifically to feedback techniques for wireless communications.

Wireless multiple-access technologies have been adopted in various telecommunication standards to provide a common protocol that enables different wireless devices to communicate on a municipal, national, regional, and even global level. An example telecommunication standard is Long Term Evolution (LTE). LTE is designed to improve spectral efficiency, lower costs, improve services, make use of new spectrum, and better integrate with other open standards. LTE may use orthogonal frequency division multiple access (OFDMA) on the downlink (DL), single-carrier frequency division multiple access (SC-FDMA) on the uplink (UL), and multiple-input multiple-output (MIMO) antenna technology.

In some examples, a wireless multiple-access communication system may include a number of base stations, each simultaneously supporting communication for multiple communication devices, otherwise known as user equipment (UEs). In a LTE or LTE-Advanced (LTE-A) network, a set of one or more base stations may define an eNodeB (eNB). In other examples (e.g., in a next generation new radio (NR) or 5G network), a wireless multiple access communication system may include a number of smart radio heads (RHs) in communication with a number of access node controllers (ANCs), where a set of one or more RHs, in communication with an ANC, defines a base station (e.g., an eNB or gNB). A base station may communicate with a set of UEs on downlink (DL) channels (e.g., for transmissions from a base station to a UE) and uplink (UL) channels (e.g., for transmissions from a UE to a base station).

A base station in some LTE or NR deployments may transmit to one or more UEs using different length transmission time intervals (TTI) that may be reduced in length relative to legacy LTE TTIs. Such a reduced length TTI may be referred to as a shortened TTI (sTTI) in some examples, and may support some low latency wireless services that provide low latency with high reliability for wireless transmissions of the low latency services. An sTTI may be a subset of one or more subframes that correspond to legacy TTI subframes or a subset of a longer TTI such as a slot-TTI. In some cases, low latency services may puncture other services that may have longer TTIs, which may result in portions of transmissions of the longer TTI service not being received at the receiver of the transmission.

SUMMARY

The described techniques relate to improved methods, systems, devices, or apparatuses that support feedback techniques based on encoded transmit blocks (TBs) in wireless communications. Generally, the described techniques provide for generation of an encoded TB that includes a number of systematic code blocks (CBs) and a number of parity CBs. The systematic CBs may be transmitted to a receiver, and the receiver may attempt to decode the systematic CBs. In some cases, one or more parity CBs may be transmitted with the systematic CBs, and the systematic CBs may be successfully decoded even in the event that one or more of the systematic CBs are not successfully received. In some cases, if a number of systematic CBs that are not successfully received, the receiver may provide feedback that requests that additional CBs be transmitted. The additional CBs may be transmitted and used at the receiver to decode the systematic CBs that were received, and it is not necessary to transmit the missing systematic CBs.

In some cases, the receiver may transmit a quantized value to indicate a number of CBs that that are needed for decoding of a transmission, which may reduce overhead associated with a feedback transmission. The quantized value may be based on a number of quantization levels that are available for feedback information, and the quantized value may be selected based on the number of CBs needed for decoding the received transmission and the number of quantization levels. In some cases, the number of quantization levels may depend upon resources that are to be used to transmit the feedback transmission. For example, different quantization levels may be used for feedback transmitted in uplink common burst resources versus feedback transmitted in an uplink-centric subframe. Furthermore, different quantization levels may be used for feedback transmitted in uplink control channel transmissions depending upon a control channel format for the uplink control channel transmissions. In some cases, different quantization levels may be used for feedback from a base station to a user equipment (UE) that may be transmitted using different downlink resources, such as in downlink control channel or shared channel resources that may be transmitted in downlink-centric subframe or in a downlink portion of an uplink-centric subframe.

A method of wireless communication is described. The method may include receiving a transmission comprising at least a portion of an encoded TB, the TB comprising systematic CBs and parity CBs, identifying a first subset of CBs of the encoded TB that are successfully received and a second subset of CBs of the encoded TB that are unsuccessfully received, and transmitting a request for transmission of one or more additional CBs based at least in part on the second subset.

An apparatus for wireless communication is described. The apparatus may include means for receiving a transmission comprising at least a portion of an encoded TB, the TB comprising systematic CBs and parity CBs, means for identifying a first subset of CBs of the encoded TB that are successfully received and a second subset of CBs of the encoded TB that are unsuccessfully received, and means for transmitting a request for transmission of one or more additional CBs based at least in part on the second subset.

Another apparatus for wireless communication is described. The apparatus may include a processor, memory in electronic communication with the processor, and instructions stored in the memory. The instructions may be operable to cause the processor to receive a transmission comprising at least a portion of an encoded TB, the TB comprising systematic CBs and parity CBs, identify a first subset of CBs of the encoded TB that are successfully received and a second subset of CBs of the encoded TB that are unsuccessfully received, and transmit a request for transmission of one or more additional CBs based at least in part on the second subset.

A non-transitory computer readable medium for wireless communication is described. The non-transitory computer-readable medium may include instructions operable to cause a processor to receive a transmission comprising at least a portion of an encoded TB, the TB comprising systematic CBs and parity CBs, identify a first subset of CBs of the encoded TB that are successfully received and a second subset of CBs of the encoded TB that are unsuccessfully received, and transmit a request for transmission of one or more additional CBs based at least in part on the second subset.

Some examples of the method, apparatus, and non-transitory computer-readable medium described above may further include processes, features, means, or instructions for receiving the one or more additional CBs responsive to the request, wherein a number of the additional CBs may be based at least in part on the second subset of CBs. Some examples of the method, apparatus, and non-transitory computer-readable medium described above may further include processes, features, means, or instructions for decoding the encoded TB based at least in part on the first subset of CBs and the received parity CBs in an absence of a retransmission the second subset of CBs.

In some examples of the method, apparatus, and non-transitory computer-readable medium described above, the encoded TB may be successfully decoded in an absence of a retransmission the second subset of CBs.

In some examples of the method, apparatus, and non-transitory computer-readable medium described above, the decoding may be based at least in part on an outer-code that may be applied to each systematic CB of the first subset of CBs and the one or more parity CBs.

In some examples of the method, apparatus, and non-transitory computer-readable medium described above, the parity CBs may be for decoding the encoded TB irrespective of a location of CBs of the second subset of CBs within the encoded TB.

In some examples of the method, apparatus, and non-transitory computer-readable medium described above, the transmitting comprises transmitting the request in an uplink common burst portion of a downlink-centric subframe.

In some examples of the method, apparatus, and non-transitory computer-readable medium described above, the encoded TB uses a first duration transmission time interval (TTI), and the identifying the second subset of CBs may be based at least in part on a first portion of the encoded TB being punctured by a second transmission having a second duration TTI that may be shorter than the first duration TTI.

Some examples of the method, apparatus, and non-transitory computer-readable medium described above may further include processes, features, means, or instructions for transmitting a negative acknowledgment (NACK) for the encoded TB when a number of CBs of the second subset of CBs exceed a threshold.

Some examples of the method, apparatus, and non-transitory computer-readable medium described above may further include processes, features, means, or instructions for receiving a retransmission of the encoded TB responsive to the NACK for the TB.

A method of wireless communication is described. The method may include receiving, from a transmitting device, a transmission comprising a plurality of CBs, identifying a first subset of the plurality of CBs that are successfully received and a second subset of the plurality of CBs that are unsuccessfully received, and transmitting, to the transmitting device, a quantized value associated with the second subset of CBs that are unsuccessfully received.

An apparatus for wireless communication is described. The apparatus may include means for receiving, from a transmitting device, a transmission comprising a plurality of CBs, means for identifying a first subset of the plurality of CBs that are successfully received and a second subset of the plurality of CBs that are unsuccessfully received, and means for transmitting, to the transmitting device, a quantized value associated with the second subset of CBs that are unsuccessfully received.

Another apparatus for wireless communication is described. The apparatus may include a processor, memory in electronic communication with the processor, and instructions stored in the memory. The instructions may be operable to cause the processor to receive, from a transmitting device, a transmission comprising a plurality of CBs, identify a first subset of the plurality of CBs that are successfully received and a second subset of the plurality of CBs that are unsuccessfully received, and transmit, to the transmitting device, a quantized value associated with the second subset of CBs that are unsuccessfully received.

A non-transitory computer readable medium for wireless communication is described. The non-transitory computer-readable medium may include instructions operable to cause a processor to receive, from a transmitting device, a transmission comprising a plurality of CBs, identify a first subset of the plurality of CBs that are successfully received and a second subset of the plurality of CBs that are unsuccessfully received, and transmit, to the transmitting device, a quantized value associated with the second subset of CBs that are unsuccessfully received.

Some examples of the method, apparatus, and non-transitory computer-readable medium described above may further include processes, features, means, or instructions for determining the quantized value based at least in part on a number of CBs in the second subset of CBs and a number of quantization levels associated with the quantized value.

In some examples of the method, apparatus, and non-transitory computer-readable medium described above, the number of quantization levels may be configured through one or more of radio resource control (RRC) signaling or downlink control information (DCI) received from the base station. In some examples of the method, apparatus, and non-transitory computer-readable medium described above, the plurality of CBs form a TB, and wherein the method further comprises transmitting a NACK for the TB when a number of CBs of the second subset of CBs exceed a threshold. Some examples of the method, apparatus, and non-transitory computer-readable medium described above may further include processes, features, means, or instructions for receiving a retransmission of the TB responsive to the NACK for the TB. Some examples of the method, apparatus, and non-transitory computer-readable medium described above may further include processes, features, means, or instructions for identifying the quantized value as a quantization level of a number of quantization levels, based at least in part on a number of CBs of the plurality of CBs.

In some examples of the method, apparatus, and non-transitory computer-readable medium described above, the identifying the two or more quantization levels further comprises determining whether the quantized value may be to be transmitted in an uplink common burst portion of a downlink-centric subframe or in an uplink-centric subframe, and identifying a first number of quantization levels associated with the uplink common burst of the downlink-centric subframe and a second number of quantization levels associated with the uplink-centric subframe.

In some examples of the method, apparatus, and non-transitory computer-readable medium described above, the transmitting the quantized value further comprises selecting the first number of quantization levels or the second number of quantization levels based at least in part on the determining, selecting one of the first number of quantization levels as the quantized value based at least in part on a number of CBs in the second subset of CBs when the first number of quantization levels may be selected, and selecting one of the second number of quantization levels as the quantized value based at least in part on the number of CBs in the second subset of CBs when the second number of quantization levels may be selected.

In some examples of the method, apparatus, and non-transitory computer-readable medium described above, the identifying the two or more quantization levels comprises determining an uplink channel for transmitting the quantized value, and identifying a number of quantization levels of the two or more quantization levels based at least in part on the uplink channel. In some examples of the method, apparatus, and non-transitory computer-readable medium described above, the identifying the two or more quantization levels further comprises determining that the uplink channel may be an uplink control channel, and identifying the number of quantization levels based at least in part on a control channel format of the uplink control channel.

In some examples of the method, apparatus, and non-transitory computer-readable medium described above, the transmitting the quantized value comprises comparing a number of CBs of the second subset of CBs to a threshold value, transmitting a CB negative acknowledgment (NACK) when the number of CBs may be below the threshold value to request one or more parity CBs for use in decoding the first subset of CBs and the second subset of CBs, and transmitting a TB NACK when the number of CBs may be at or above the threshold value to request of retransmission of all of the plurality of CBs. Some examples of the method, apparatus, and non-transitory computer-readable medium described above may further include processes, features, means, or instructions for receiving, responsive to the CB NACK, the one or more parity CBs, and wherein the number of parity CBs may be based at least in part on one or more retransmissions of one or more CBs of the second subset of CBs. Some examples of the method, apparatus, and non-transitory computer-readable medium described above may further include processes, features, means, or instructions for receiving, responsive to the TB NACK, a retransmission of an encoded TB that includes the plurality of CBs and one or more parity CBs, and wherein the number of parity CBs included in the retransmissions may be indicated in one or more of RRC signaling or DCI associated with the retransmission.

A method of wireless communication is described. The method may include transmitting, to a UE, a transmission comprising at least a portion of an encoded TB, the encoded TB comprising systematic CBs and parity CBs, receiving a request from the UE for transmission of one or more additional CBs, the request indicating that one or more CBs of the encoded TB are unsuccessfully received, and transmitting the one or more additional CBs to the UE for use in decoding the encoded TB.

An apparatus for wireless communication is described. The apparatus may include means for transmitting, to a UE, a transmission comprising at least a portion of an encoded TB, the encoded TB comprising systematic CBs and parity CBs, means for receiving a request from the UE for transmission of one or more additional CBs, the request indicating that one or more CBs of the encoded TB are unsuccessfully received, and means for transmitting the one or more additional CBs to the UE for use in decoding the encoded TB.

Another apparatus for wireless communication is described. The apparatus may include a processor, memory in electronic communication with the processor, and instructions stored in the memory. The instructions may be operable to cause the processor to transmit, to a UE, a transmission comprising at least a portion of an encoded TB, the encoded TB comprising systematic CBs and parity CBs, receive a request from the UE for transmission of one or more additional CBs, the request indicating that one or more CBs of the encoded TB are unsuccessfully received, and transmit the one or more additional CBs to the UE for use in decoding the encoded TB.

A non-transitory computer readable medium for wireless communication is described. The non-transitory computer-readable medium may include instructions operable to cause a processor to transmit, to a UE, a transmission comprising at least a portion of an encoded TB, the encoded TB comprising systematic CBs and parity CBs, receive a request from the UE for transmission of one or more additional CBs, the request indicating that one or more CBs of the encoded TB are unsuccessfully received, and transmit the one or more additional CBs to the UE for use in decoding the encoded TB.

Some examples of the method, apparatus, and non-transitory computer-readable medium described above may further include processes, features, means, or instructions for receiving an acknowledgment (ACK) from the UE indicating successful receipt of the encoded TB in an absence of a retransmission of the one or more CBs of the TB that may be unsuccessfully received.

Some examples of the method, apparatus, and non-transitory computer-readable medium described above may further include processes, features, means, or instructions for applying an outer-code to each systematic CB of an unencoded TB to generate the encoded TB, and wherein the outer-code and the one or more parity CBs allow the UE to decode the encoded TB when one or more CBs of the encoded TB may be not successfully received at the UE.

In some examples of the method, apparatus, and non-transitory computer-readable medium described above, the receiving comprises receiving the request in an uplink common burst portion of a downlink-centric subframe. Some examples of the method, apparatus, and non-transitory computer-readable medium described above may further include processes, features, means, or instructions for receiving a NACK for the encoded TB when a number of CBs of the second subset of CBs exceed a threshold. Some examples of the method, apparatus, and non-transitory computer-readable medium described above may further include processes, features, means, or instructions for transmitting a retransmission of the encoded TB responsive to the NACK.

A method of wireless communication is described. The method may include transmitting a plurality of CBs to a UE, receiving, from the UE, a quantized value indicating that a subset of the CBs are unsuccessfully received at the UE, and transmitting one or more additional CBs or a retransmission of one or more CBs based at least in part on the quantized value.

An apparatus for wireless communication is described. The apparatus may include means for transmitting a plurality of CBs to a UE, means for receiving, from the UE, a quantized value indicating that a subset of the CBs are unsuccessfully received at the UE, and means for transmitting one or more additional CBs or a retransmission of one or more CBs based at least in part on the quantized value.

Another apparatus for wireless communication is described. The apparatus may include a processor, memory in electronic communication with the processor, and instructions stored in the memory. The instructions may be operable to cause the processor to transmit a plurality of CBs to a UE, receive, from the UE, a quantized value indicating that a subset of the CBs are unsuccessfully received at the UE, and transmit one or more additional CBs or a retransmission of one or more CBs based at least in part on the quantized value.

A non-transitory computer readable medium for wireless communication is described. The non-transitory computer-readable medium may include instructions operable to cause a processor to transmit a plurality of CBs to a UE, receive, from the UE, a quantized value indicating that a subset of the CBs are unsuccessfully received at the UE, and transmit one or more additional CBs or a retransmission of one or more CBs based at least in part on the quantized value.

In some examples of the method, apparatus, and non-transitory computer-readable medium described above, the quantized value may be based at least in part on a number of CBs in the subset of the CBs and a number of quantization levels associated with the quantized value. Some examples of the method, apparatus, and non-transitory computer-readable medium described above may further include processes, features, means, or instructions for configuring, at the UE, the number of quantization levels through one or more of RRC signaling or DCI.

In some examples of the method, apparatus, and non-transitory computer-readable medium described above, the plurality of CBs form a TB, and wherein the method further comprises: receiving, from the UE, a NACK for the TB that indicates a number of CBs of the subset of CBs exceed a threshold. Some examples of the method, apparatus, and non-transitory computer-readable medium described above may further include processes, features, means, or instructions for transmitting a retransmission of the TB responsive to the NACK for the TB.

Some examples of the method, apparatus, and non-transitory computer-readable medium described above may further include processes, features, means, or instructions for configuring the UE with two or more quantization levels for the quantized value based at least in part on a number of CBs of the plurality of CBs. In some examples of the method, apparatus, and non-transitory computer-readable medium described above, the two or more quantization levels may be based at least in part on one or more of: an uplink transmission used for transmitting the quantized value, an uplink channel for transmitting the quantized value, or a control channel format of an uplink control channel for transmitting the quantized value.

Some examples of the method, apparatus, and non-transitory computer-readable medium described above may further include processes, features, means, or instructions for determining that the quantized value indicates a CB NACK. Some examples of the method, apparatus, and non-transitory computer-readable medium described above may further include processes, features, means, or instructions for transmitting, responsive to the CB NACK, one or more CBs, and wherein a number of the CBs may be based at least in part on one or more retransmissions of one or more CBs of the subset of the CBs.

Some examples of the method, apparatus, and non-transitory computer-readable medium described above may further include processes, features, means, or instructions for determining that the quantized value indicates a TB NACK. Some examples of the method, apparatus, and non-transitory computer-readable medium described above may further include processes, features, means, or instructions for transmitting, responsive to the TB NACK, a retransmission of an encoded TB that includes the plurality of CBs and one or more parity CBs, and wherein a number of parity CBs included in the retransmission may be indicated in one or more of RRC signaling or DCI associated with the retransmission.

DETAILED DESCRIPTION

Figure 1:
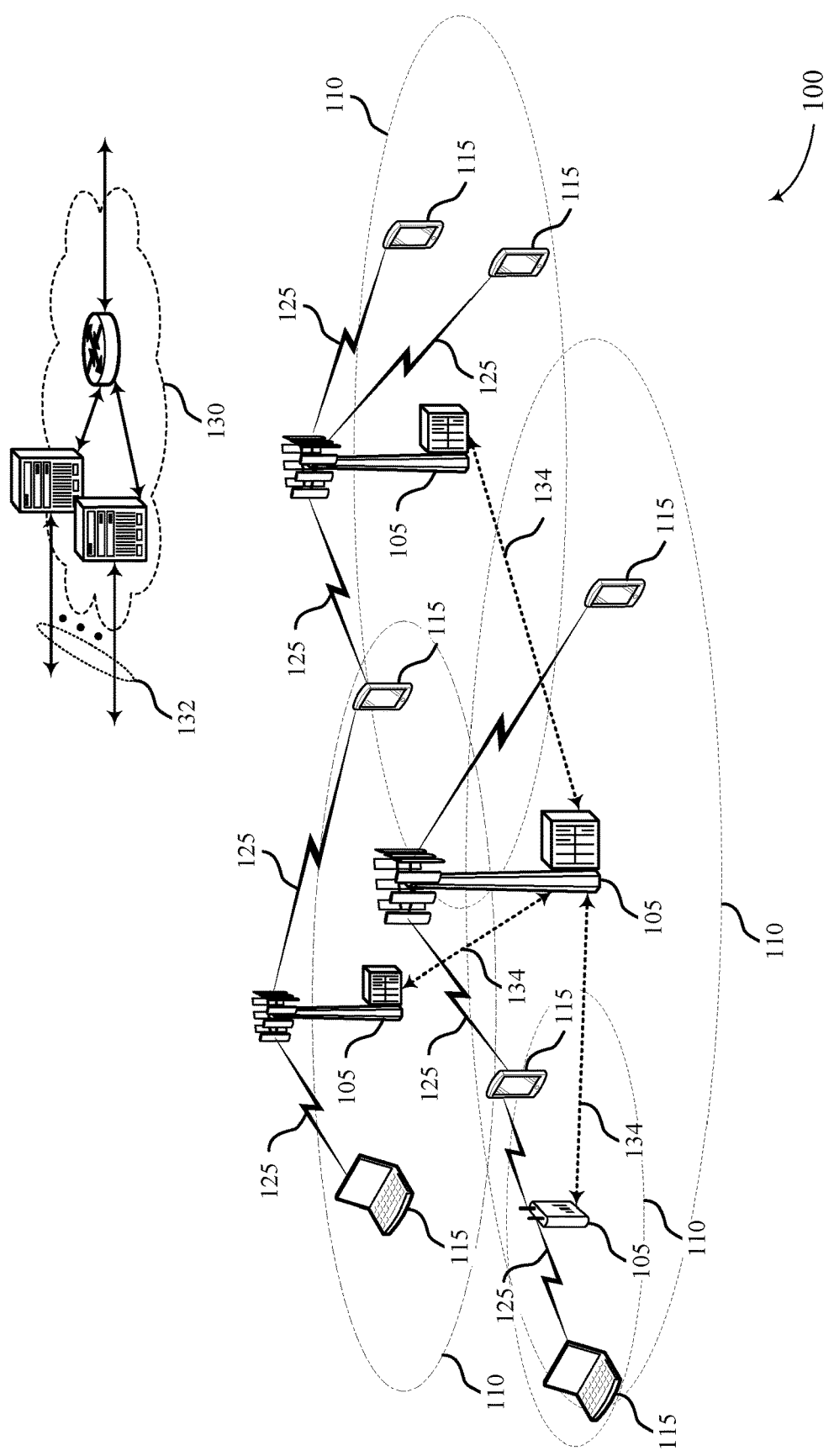
FIG. 1 illustrates an example of a system for wireless communication that supports feedback techniques for wireless communications in accordance with aspects of the present disclosure.

The described techniques relate to improved methods, systems, devices, or apparatuses that support feedback techniques based on encoded transmit blocks (TBs) in wireless communications. In some examples, an encoded TB may include a number of systematic code blocks (CBs) and a number of parity CBs. The systematic CBs may be transmitted to a receiver, and the receiver may attempt to decode the systematic CBs. In some cases, one or more parity CBs may be transmitted with the systematic CBs, and the systematic CBs may be successfully decoded even in the event that one or more of the systematic CBs are not successfully received. In some cases, if a number of systematic CBs that are not successfully received, a receiver may provide feedback that requests that additional CBs be transmitted. The additional CBs may be transmitted and used at the receiver to decode the systematic CBs that were received, and it is not necessary to retransmit the missing systematic CBs. Thus, additional CBs may be transmitted only when needed by a receiver to decode the TB, and system resources may be efficiently utilized.

In some cases, the receiver may transmit a quantized value to indicate a number of CBs that that are needed in order to decode the TB, which may reduce overhead associated with a feedback transmission and further enhance efficient use of system resources. The quantized value may be based on a number of quantization levels that are available for feedback information, and the quantized value may be selected based on the number of unsuccessfully received CBs and the number of quantization levels. In some cases, the number of quantization levels may depend upon resources that are to be used to transmit the feedback transmission. For example, different quantization levels may be used for feedback transmitted in uplink common burst resources versus feedback transmitted in an uplink-centric subframe. Furthermore, different quantization levels may be used for feedback transmitted in uplink control channel transmissions depending upon a control channel format for the uplink control channel transmissions. In some cases, different quantization levels may be used for feedback from a base station to a user equipment (UE) that may be transmitted using different downlink resources, such as in downlink control channel or shared channel resources that may be transmitted in downlink-centric subframe or in a downlink portion of an uplink-centric subframe.

Resources allocated for wireless transmissions may be used for uplink and/or downlink communications that are relatively latency sensitive (referred to as low latency communications) relative to communications that may be relatively latency insensitive, such as enhanced mobile broadband (eMBB) transmissions that may use a 1 ms (or legacy LTE) TTI duration. In some cases, a TTI duration for wireless transmissions may correspond to one slot of a wireless subframe, one orthogonal frequency division multiplexing (OFDM) symbol, or multiple (e.g., 2, 3, or 4) OFDM symbols. In some examples, a 1 ms TTI duration may correspond to a duration of a 1 ms subframe.

In some cases, wireless communications systems may use scalable TTI durations, and may provide for multiple different wireless services that may use different TTI durations based on latency requirements or quality of service (QoS) requirements of the service. Such different services may be selected depending upon the nature of the communications. For example, communications that require low latency and high reliability, sometimes referred to as mission critical (MiCr) communications, may be served through a lower-latency service (e.g., an ultra-reliable low-latency communication (URLLC) service) that uses reduced TTI durations (e.g., one-symbol or two-symbol TTIs). Correspondingly, communications that are more delay-tolerant may be served through a service that provides relatively higher throughput with somewhat higher latency, such as a mobile broadband service (e.g., an eMBB service) that uses slot TTIs, or 1 ms or longer TTIs. In other examples, communications may be with UEs that are incorporated into other devices (e.g., meters, vehicles, appliances, machinery, etc.), and a machine-type communication (MTC) service (e.g., massive MTC (mMTC)) may be used for such communications. In some cases, different services (e.g., eMBB, URLLC, mMTC) may have different TTIs, different sub-carrier (or tone) spacing and different cyclic prefixes.

The present disclosure describes various techniques with reference to 4G networks (e.g., LTE networks) and next generation networks (e.g., 5G or NR networks) that are being designed to support features such as high bandwidth operations, more dynamic subframe/slot types, and self-contained subframe/slot types (in which HARQ feedback for a subframe/slot may be transmitted before the end of the subframe/slot). However, such techniques may be used for any system in which feedback may be provided Hybrid ARQ (HARQ) for a portion of a TTI and retransmissions provided according to configured repetition levels that provide two or more retransmissions.

Aspects of the disclosure are initially described in the context of a wireless communications system. Various sTTI structures and sets of resources are then described. Aspects of the disclosure are further illustrated by and described with reference to apparatus diagrams, system diagrams, and flowcharts that relate to feedback techniques for wireless communications.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-clomplexity devices. Wireless communications system 100 may provide for wireless transmissions in which transmitted TBs may be encoded to provide systematic CBs and parity CBs, and in which a receiver may successfully decode an encoded transmission using one or more parity CBs even in the event that one or more systematic CBs may not be successfully received. Such techniques may allow for higher reliability transmissions and efficient system operation.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a TTI of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the geographic coverage area 110 of a cell. Other UEs 115 in such a group may be outside the geographic coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105 or gNodeBs (gNBs) 105.

A base station 105 may be connected by an S1 interface to the core network 130. The core network may be an evolved packet core (EPC), which may include at least one MME, at least one S-GW, and at least one P-GW. The MME may be the control node that processes the signaling between the UE 115 and the EPC. All user internet protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service (PSS).

The core network 130 may provide user authentication, access authorization, tracking, IP connectivity, and other access, routing, or mobility functions. At least some of the network devices, such as a base station 105 may include subcomponents such as an access network entity, which may be an example of an access node controller (ANC). Each access network entity may communicate with a number of UEs 115 through one or more access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although in some cases WLAN networks may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (ELF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming).

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a network device or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, as discussed above, a TTI may be shorter than a subframe (e.g., a sTTI) or may be dynamically selected (e.g., in short TTI bursts or in selected component carriers using short TTIs).

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communications system 100 may utilize enhanced component carriers (eCCs). An eCC may be characterized by one or more features including: wider bandwidth, shorter symbol duration, shorter transmission time interval (TTIs), and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power). In some cases, an eCC may utilize a different symbol duration than other CCs, which may include use of a reduced symbol duration as compared with symbol durations of the other CCs. A shorter symbol duration may be associated with increased subcarrier spacing. A TTI in an eCC may consist of one or multiple symbols. In some cases, the TTI duration (that is, the number of symbols in a TTI) may be variable.

As indicated above, in some cases, base stations 105 and UEs 115 may use feedback techniques based on encoded TBs in wireless communications. In some examples, an encoded TB may include a number of systematic CBs and a number of parity CBs. For example, a forward error correction (FEC) code, such as a maximum distance separable (MDS) outer code, may be applied to CBs of the unencoded TB to generate systematic CBs and a number (e.g., r) of parity CBs. In such examples, r systematic CBs may be recoverable such that even if r CBs are lost, the TB can be decoded successfully. The systematic CBs may be transmitted to a receiver (e.g., a base station 105 or a UE 115), and the receiver may attempt to decode the systematic CBs. In some cases, one or more parity CBs may be transmitted with the systematic CBs, and the systematic CBs may be successfully decoded even in the event that one or more of the systematic CBs are not successfully received. In some cases, if a number of systematic CBs are not successfully received a receiver may provide feedback that requests that additional CBs be transmitted. The additional CBs may be transmitted and used at the receiver to decode the systematic CBs that were received, and it is not necessary to retransmit the missing systematic CBs. Thus, additional CBs may be transmitted only when needed by a receiver to decode the TB, and system resources may be efficiently utilized.

In some cases, the receiver may transmit a quantized value to indicate a number of CBs that are needed to decode the transmission, which may reduce overhead associated with a feedback transmission and further enhance efficient use of system resources. The quantized value may be based on a number of quantization levels that are available for feedback information, and the quantized value may be selected based on the number of unsuccessfully received CBs and the number of quantization levels. In some cases, the number of quantization levels may depend upon resources that are to be used to transmit the feedback transmission. For example, different quantization levels may be used for feedback transmitted in uplink common burst resources versus feedback transmitted in an uplink-centric subframe. Furthermore, different quantization levels may be used for feedback transmitted in uplink control channel transmissions depending upon a control channel format for the uplink control channel transmissions. In some cases, different quantization levels may be used for feedback from a base station to a UE that may be transmitted using different downlink resources, such as in downlink control channel or shared channel resources that may be transmitted in downlink-centric subframe or in a downlink portion of an uplink-centric subframe.

Figure 2:
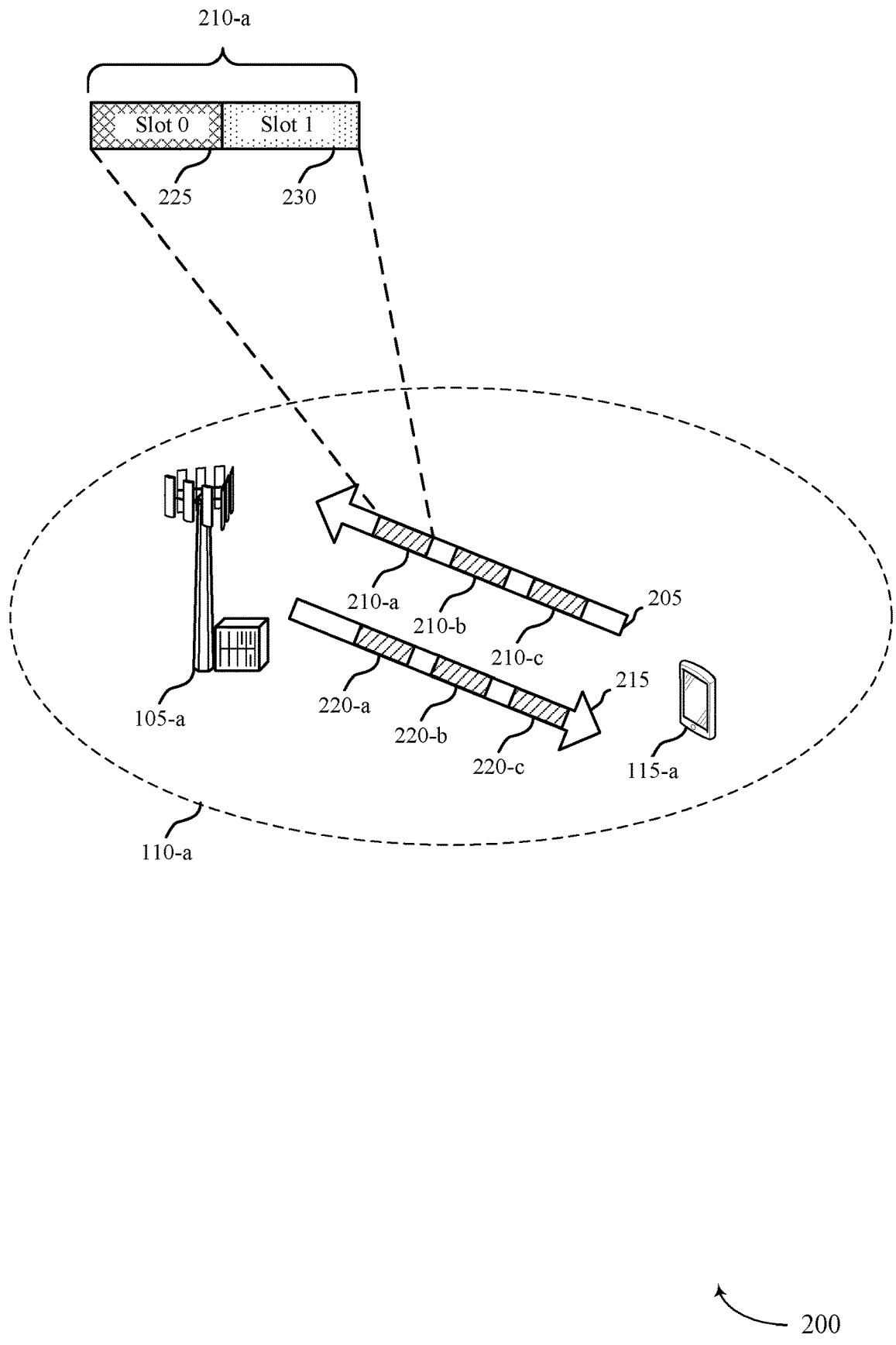
FIG. 2 illustrates an example of a wireless communications system that supports feedback techniques for wireless communications in accordance with aspects of the present disclosure.

FIG. 2 illustrates an example of a wireless communications system 200 that supports feedback techniques for wireless communications in accordance with various aspects of the present disclosure. Wireless communications system 200 includes a base station 105-a and a UE 115-a, which may be examples of aspects of a base station 105 or UE 115 as described above with reference to FIG. 1. In the example of FIG. 2, the wireless communications system 200 may operate according to a radio access technology (RAT) such as a LTE, 5G, or NR RAT, although techniques described herein may be applied to any RAT and to systems that may concurrently use two or more different RATs.

The base station 105-a may communicate with UE 115-a, and one or more other UEs within a geographic coverage area 110-a of the base station 105-a, over an uplink carrier 205 and a downlink carrier 215. In some examples, the base station 105-a may allocate resources for communication with UEs over uplink carrier 205 and downlink carrier 215. For example, base station 105-a may allocate uplink resources 210 in uplink carrier 205 for uplink transmissions from UE 115-a, and may allocated downlink resources 220 in downlink carrier 215 for downlink transmissions from the base station 105-a to the UE 115-a. In some cases, one or more uplink resources 210 or downlink resources 220 may correspond to 0.5 ms transmission slot. In some cases, one or more uplink resources 210 or downlink resources 220 may correspond to a legacy LTE TTI of 1 ms. In this example, uplink resources 210 may include a first uplink resource 210-a, a second uplink resource 210-b, and a third uplink resource 210-c. Each of the uplink resources 210 may include two slots, in which each slot may have a number of OFDM symbols. In this example, a first slot (slot 0) 225 and a second slot (slot 1) 230 may be included in the first uplink resource 210-a. Downlink carrier 215 may have downlink resources 220 allocated in a similar manner.

As indicated above, in the uplink of a low latency system, different TTI lengths may be used for transmissions over uplink carrier 205. For example, one-symbol TTI, two-symbol TTI, and 1-slot TTI durations may be supported for physical uplink control channel (PUCCH) and physical uplink shared channel (PUSCH) transmissions. Thus, within first slot 225 or second slot 230, there may be multiple TTIs.

Figure 3:
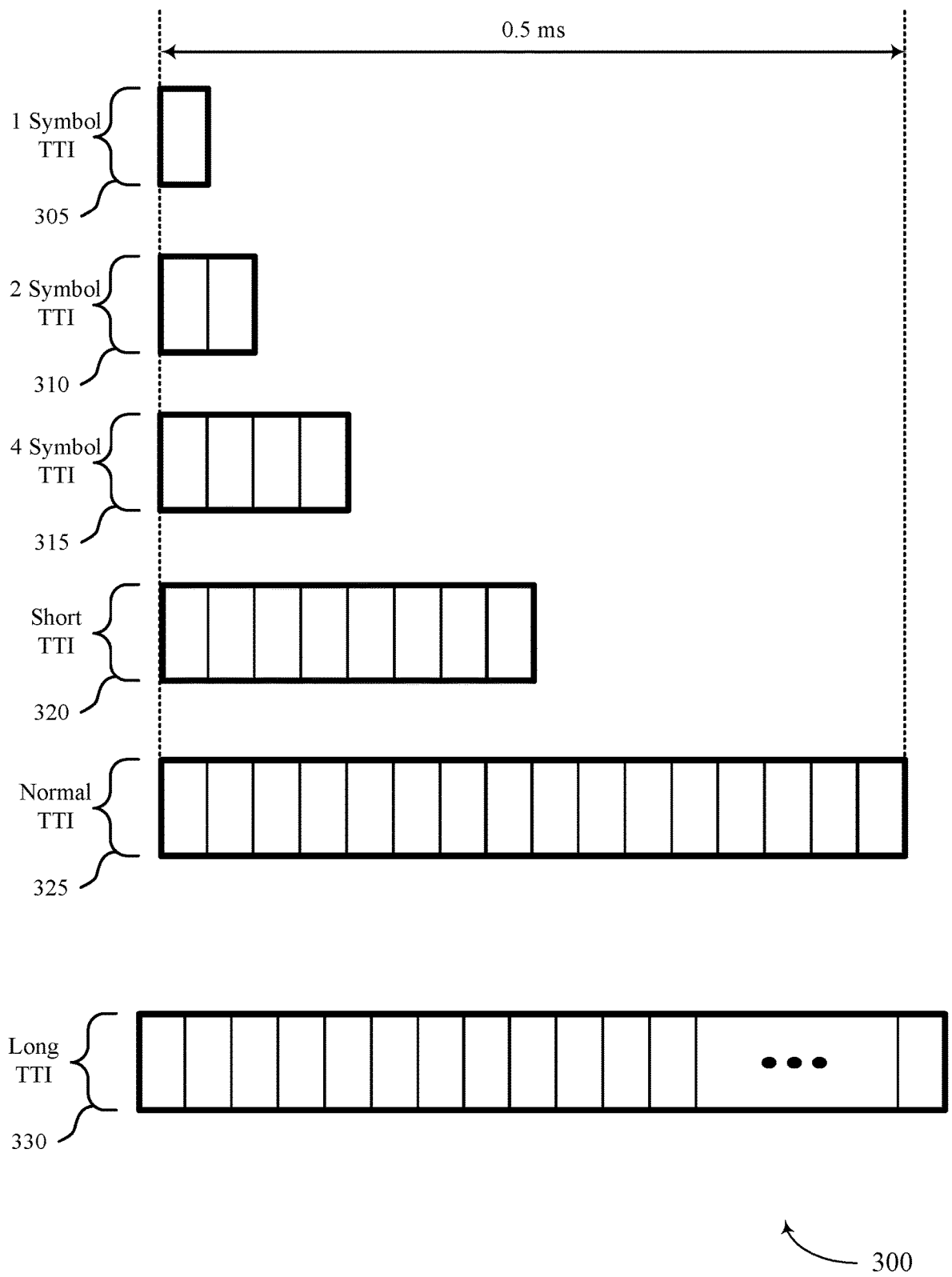
FIG. 3 illustrates an example of a scalable TTIs that support feedback techniques for wireless communications in accordance with aspects of the present disclosure.

FIG. 3 illustrates an example of scalable TTIs 300 that supports feedback techniques for wireless communications in accordance with various aspects of the present disclosure. The scalable TTIs 300 may be used for communications between a UE and a base station such as discussed above with respect to FIGS. 1 and 2. Various different configurations of TTIs may be implemented, in which TTIs may be arranged to be aligned with subframes or slots. Note that while the symbols illustrated in FIG. 3 are all illustrated as having a same length, depending on the numerology (e.g., subcarrier spacing) the symbol lengths could also be different. For example, 2 symbols under 30 khz carrier spacing have the same lengths as one symbol under 15 khz subcarrier spacing. Thus, the examples provided in FIG. 3 are not necessarily to scale, and symbol lengths may be used in some cases.

In some cases, such as NR deployments, scalable TTIs may be used for diverse latency, efficiency and reliability requirements. For example, latency sensitive services, such as MiCr or URLLC services, may use relatively short TTIs, such as a one-symbol TTI 305, a two-symbol TTI 310, a four-symbol TTI 315, or a short TTI 320 that corresponds to a duration of one-half of a 0.5 ms slot. In some cases, such MiCr or URLLC services may have a high reliability requirement and a latency bound of less than 1 ms. Furthermore, services that may be relatively latency insensitive, such as eMBB services, may use relatively longer TTI durations, such as a four-symbol TTI 315, a short TTI 320, a normal TTI 325 that has a duration that corresponds to one 0.5 ms slot, or a long TTI 330 that may have a duration of 1 ms or longer. Services that use such longer TTI durations may provide relatively low average latency, relatively high spectrum efficiency, and high reliability within a more relaxed latency bound than MiCr or URLLC services.

In some examples, eMBB and MiCr services may be scheduled at different TTI intervals to meet respective QoS requirements, and may be multiplexed in the same time-frequency resource: In some cases, MiCr or URLLC services may use relatively wideband frequency resources to achieve relatively high capacity, and multiplexing between eMBB and MiCr may be used to achieve efficient resource utilization. As indicated above, URLLC or MiCr services may have priority over eMBB or higher-latency services, and transmissions of such lower latency services may can puncture resource elements already allocated to eMBB transmissions, and in such situations some CBs of the eMBB service may be lost.

As indicated above, in some cases transmitted TBs may be encoded using a FEC, and one or more parity CBs may be generated. In the event that one or more CBs are punctured, the CBs may still be successfully decoded at a receiver using the one or more parity CBs. In some cases, a transmitter (e.g., a UE or a base station) may not transmit all of the parity CBs for an encoded TB, and only transmits held back parity CBs upon receipt of a request from the receiver. Thus, if a longer TTI transmission is punctured by a shorter TTI transmission, a retransmission of one or more CBs may be avoided through transmitting parity CBs that enable the recovery of lost systematic CBs, and thus system efficiency can be enhanced. In such cases, a receiving device, such as a UE or a base station, can request more CBs in the event that one or more missing systematic CBs may not be successfully decoded or are punctured. In some cases, a receiver may transmit a quantized value that indicates a number of CBs that are to be transmitted. Indication only of a number of CBs may thus reduce the overhead for feedback transmissions relative to having to provide feedback on a CB-basis. Quantized values for feedback may even further reduce the overhead for such feedback transmissions.

Figure 4:
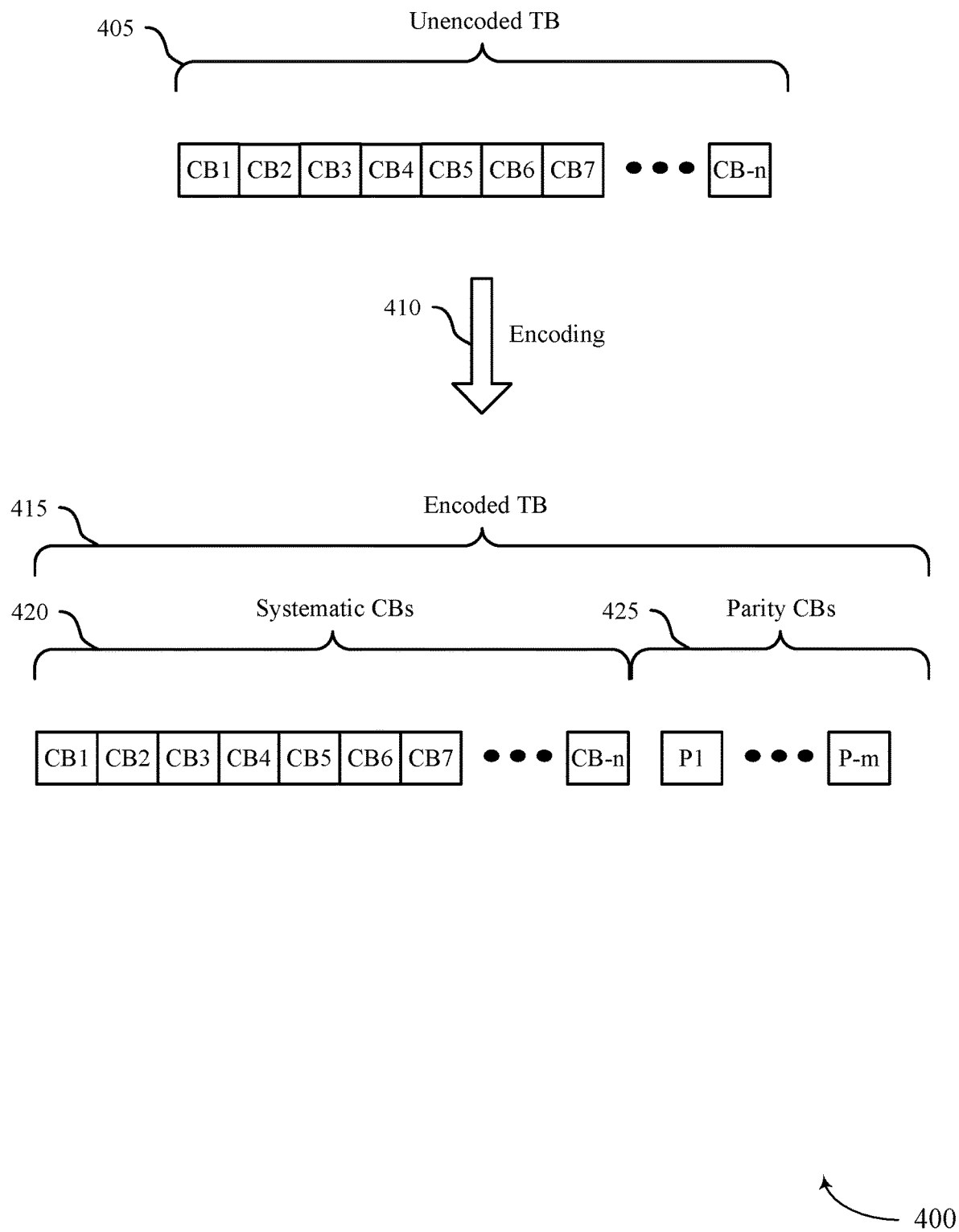
FIG. 4 illustrates an example of an encoded TB that supports feedback techniques for wireless communications in accordance with aspects of the present disclosure.

FIG. 4 illustrates an example of an encoded TB 400 that supports feedback techniques for wireless communications in accordance with various aspects of the present disclosure. The encoded TB 400 may be used for communications between a UE and a base station such as discussed above with respect to FIGS. 1 and 2.

In this example, transmitter, such as a UE or a base station, may identify an unencoded TB 405 that is to be transmitted to a receiver. The unencoded TB 405 may include a number of CBs, and an encoding process 410 may be applied to the unencoded TB 405 to generate encoded TB 415. In some cases, the encoding may be MDS coding, which may generate m parity CBs 425 for n systematic CBs 420. In such cases, the parity CBs 425 may be used to correct for a loss of up to m CBs 420. In some cases, the values of n and m may be determined based on traffic patterns, channel conditions, specified values, or combinations thereof. As indicated above, in some cases a transmitter may initially transmit fewer than all of the parity CBs 425, and transmit additional parity CBs 425 upon request. Thus, in the event that all of the systematic CBs 420 are received, no additional parity CBs 425 may need to be transmitted. Further, if one or more of the parity CBs 425 are transmitted in a particular TTI, a receiver may be able to correct for a loss of one or more systematic CBs 420 without additional parity CB 425 transmissions. Thus, a receiver requests the required overhead (number of additional parity CBs 425) based on its observation of how many coded CBs 420 are unsuccessfully received, and how many parity CBs 425 may be needed to successfully decode the received systematic CBs 420.

Figure 5:
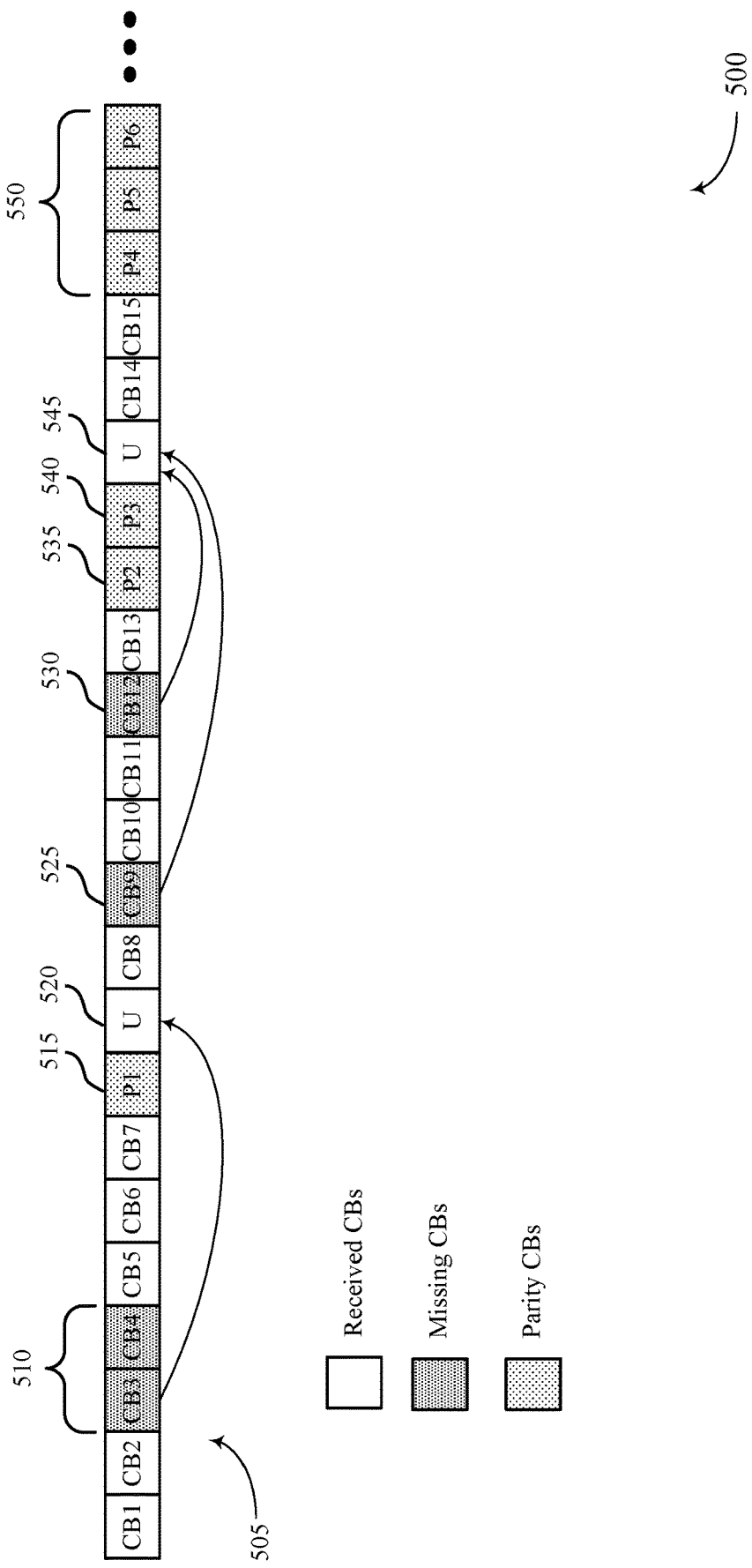
FIG. 5 illustrates an example of a wireless transmission that supports feedback techniques for wireless communications in accordance with aspects of the present disclosure.

FIG. 5 illustrates an example of a wireless transmission 500 that supports feedback techniques for wireless communications in accordance with various aspects of the present disclosure. The wireless transmission may be used for communications between a UE and a base station such as discussed above with respect to FIGS. 1 and 2.

In this example, transmitter, such as a UE or a base station, may communicate over a link 505 that may be used to transmit a number of systematic CBs. In this example, a CB1 through CB7 may be transmitted in a downlink-centric subframe, and two CBs 510, namely CB3 and BC4, may not be successfully received by a UE. The base station may transmit a first parity CB 515, but since two systematic CBs are missing, the UE may need additional parity CBs to successfully decode the systematic CBs CB1 through CB7. In this example, UE may send a request for additional parity CBs in an uplink transmission 520, which may be an common burst or an uplink transmission in an uplink-centric subframe. Responsive to the request for additional parity CBs, the base station may transmit additional parity CBs 535 and 540, which the UE may use to decode the systematic CBs. Note that this simply one example, and in other cases the receiver may not request for more parity CBs and may request a number of additional CBs. In some examples, a transmitter may send some systematic CBs plus r parity CBs, and if more than r CBs are lost, then the receiver may request more CBs. In the example of FIG. 5, following the first request for parity, systematic CB 525 and systematic CB 530 may not be successfully decoded, and another request for additional CBs may be transmitted in a subsequent uplink transmission 545. The base station may then transmit additional parity CBs 550, which may be used to decode the systematic CBs CB1 through CB13. While FIG. 5 illustrates a downlink transmission from a base station to a UE, the same process may be used for uplink transmissions from a UE to a base station, in which the base station may request more CBs via an uplink grant.

As discussed above, a set of parity CBs may be generated based on the systematic CBs, but not transmitted until a request for such parity CBs is received. During the initial transmissions up to the first uplink transmission 520, a set of systematic CBs are sent, along with optional parity CB 515. In some examples, no parity CBs may be transmitted until a request is received. In some cases, a base station may configure whether one or more parity CBs are transmitted in the absence of a request for parity CBs, such as based on traffic or channel conditions, for example. Thus, depending on the number of missing systematic CBs, the UE requests for more parity, and UE does not send a TB-level ACK/NACK (i.e., PHY level retransmission), and in subsequent transmissions, based on the UE's requests, more parity CBs are sent. In some cases, sets of transmissions of systematic CBs may be referred to as MAC PHY first through n-th transmissions.

As indicated above, in some cases quantized values may be provided for feedback on a number of CBs needed in order to decode the transmission. Further, using such an asynchronous FEC HARQ approach, a receiver will send the number of CBs needed in the feedback transmission. In some cases, such as in NR systems, the number of systematic CBs may be relatively large, which may require a relatively large number of bits to provide for feedback. For example, with $N_{cb}$ CBs, $\log_2(N_{cb})$ bits would be needed for feedback transmissions. Thus, if, $N_{cb}=128$, seven bits of feedback information would need to be available. In some cases, it may be desirable to reduce feedback overhead. For example, in some cases feedback may be provided in common burst transmissions, or by a UE that may be coverage limited, the available resources for sending the feedback may be limited. In some cases, the overhead associated with feedback transmissions may be reduced through quantization of the number of CBs needed in the retransmissions. In such examples, the number of CBs, 1 to $N_{cb}$, may be quantized into L levels, where each level is associated with one quantized value. In one specific example, if the required number of CBs is between 1 and 4 (while the total number of CBs is 128), the UE may request for 4 CBs. The overhead of the feedback, hence, can be reduced to $\log_2(L)$. In some cases, the number of quantization levels (L) may be configured based on resources that may be used to transmit the feedback information.

Figure 6:
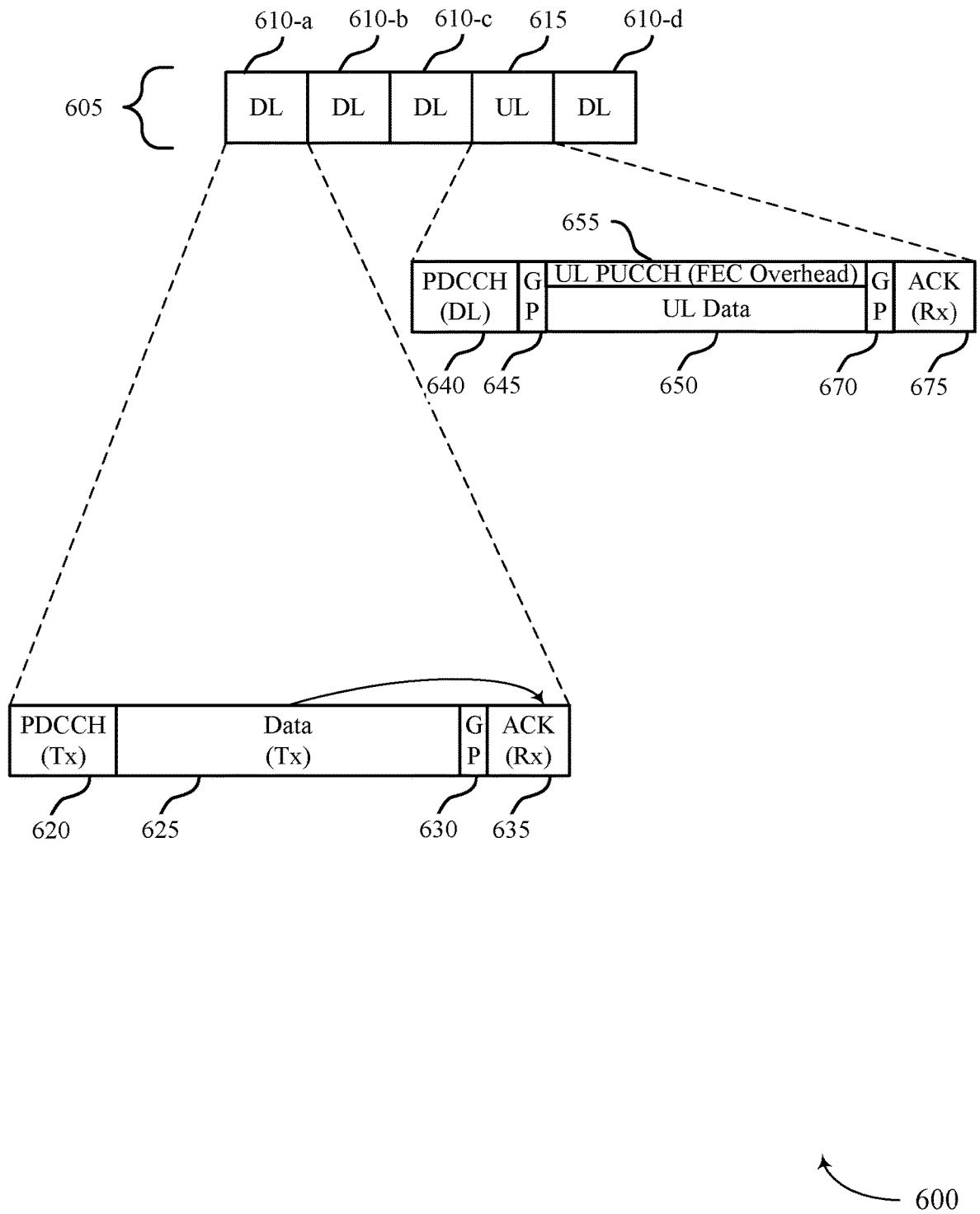
FIG. 6 illustrates an example of wireless resources that support feedback techniques for wireless communications in accordance with aspects of the present disclosure.

FIG. 6 illustrates an example of wireless resources 600 that support feedback techniques for wireless communications in accordance with various aspects of the present disclosure. Wireless resources 600 may be used for systematic and parity CB transmission, as well as feedback transmissions between a UE and a base station such as discussed above with respect to FIGS. 1 and 2.

In the example of FIG. 6, link 605 may include downlink-centric TTIs 610 and uplink-centric TTI 615. The downlink-centric TTIs may, for example, include a physical downlink control channel (PDCCH) transmission portion 620, a data portion 625 (e.g., PDSCH), a guard period 630, and an uplink common burst portion 635 that may be used to provide ACK/NACK feedback. The uplink-centric TTI 615 may, for example, include a PDCCH downlink transmission portion 640, a guard period 645, an uplink portion that may include an uplink data portion (e.g., PUSCH) 650 and an uplink PUCCH portion 655, which may be used to transmit FEC overhead such as feedback information. A second guard period 670 may follow the uplink portion, followed by a downlink burst transmission 675 that may include ACK/NACK feedback from a base station to a UE. Thus, various different resources may be used for transmission of feedback information. For uplink feedback transmissions in some examples, a UE has an option to send an acknowledgment (ACK) to indicate no retransmission or the number of CBs needed, send a TB-level NACK to indicate a PHY-level retransmission of the entire TB, or a CB NACK with a value associated with one of the quantized levels.

In some cases, the number of quantization levels may be configurable. For example, a finer quantization may be configured if the uplink feedback is to be transmitted over uplink-centric TTI 615, and a coarser quantization may be configured if the uplink feedback is to be transmitted over an uplink common burst 625. As compared to the uplink-centric TTI 615, the duration of the uplink common burst 625 is shorter and fewer bits are available for feedback information. In some cases, quantization levels for each case are known at the UE and the base station, and may be configured by the base station via RRC signaling or DCI, for example. Similarly, the number of quantization levels can be different depending on the PUCCH design, as some PUCCH formats may carry a larger number of bits as compared to others. Additionally, the number of quantization levels may depend on whether the feedback is sent over the PUSCH or PUCCH, as a larger number of bits can be sent over PUSCH. In still further examples, overhead associated with feedback transmissions may be further reduced by simply indicating one or a TB ACK, a TB NACK, or a CB NACK, thus providing three quantization levels. If the CB NACK is sent, the number of additional CBs may be set by higher layers for each retransmission (e.g., for the first retransmission the number of additional CBs may be different than for the second retransmission, and so on).

Figure 7:
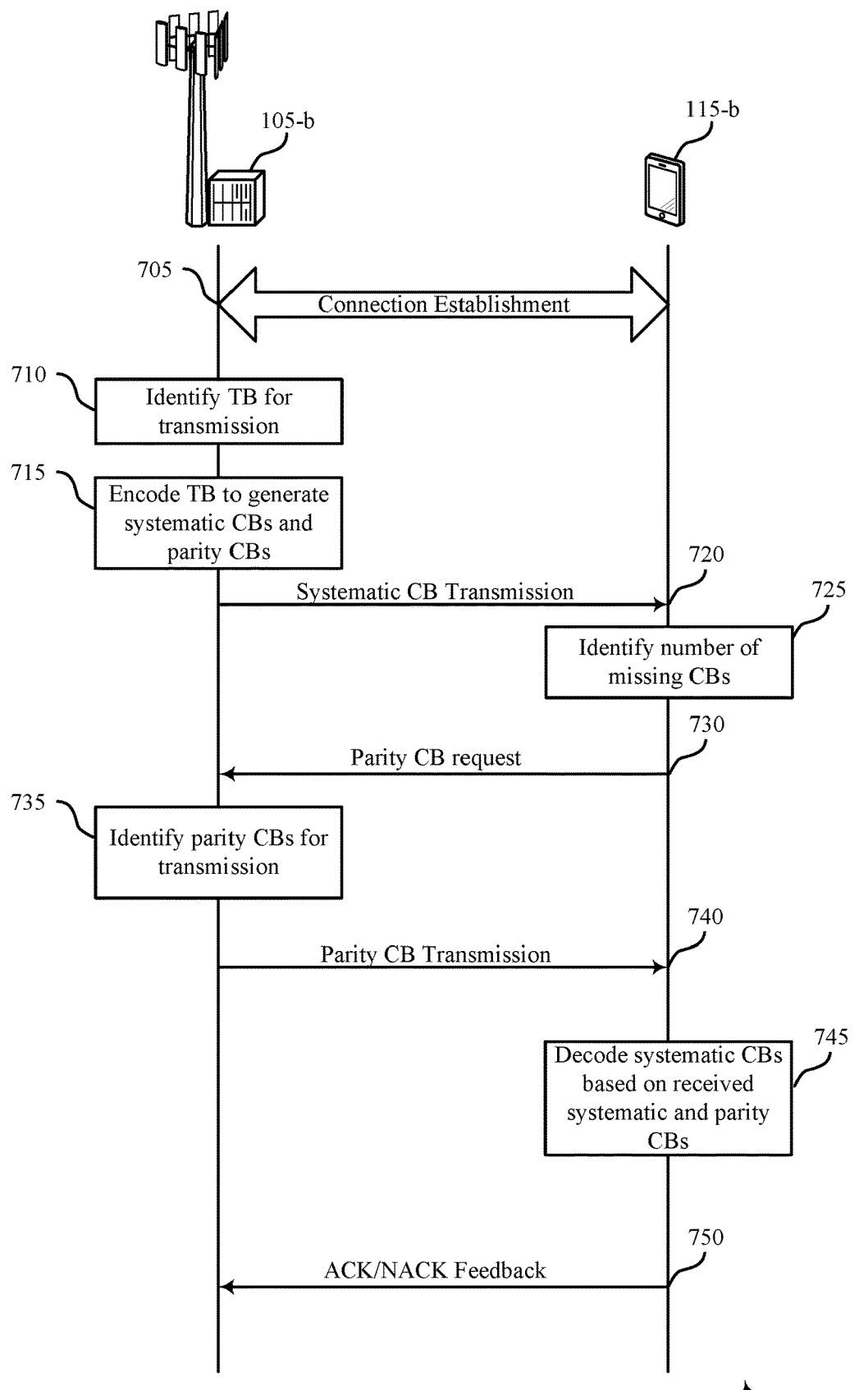
FIG. 7 illustrates an example of a process flow that supports feedback techniques for wireless communications in accordance with aspects of the present disclosure.

FIG. 7 illustrates an example of a process flow 800 that supports feedback techniques for wireless communications in accordance with various aspects of the present disclosure. Process flow 700 may include a base station 105-b, and a UE 115-b, which may be examples of the corresponding devices described with reference to FIG. 1-2. While the example of FIG. 7 illustrates a downlink transmission from base station 105-b to UE 115-b, the techniques described herein are equally applicable to uplink transmissions from UE 115-b to the base station 105-b.

The base station 105-b and the UE 115-b may establish a connection 705 according to connection establishment techniques for the wireless communications system. At block 710, the base station may identify a TB for transmission to the UE 115-b. At block 715, the base station 105-b may encode the TB to generate systematic CBs and parity CBs. The encoding may be outer-level FEC coding, for example, as discussed above. The base station 105-b may transmit a downlink transmission 720 with systematic CBs to the UE 115-b.

At block 725, the UE 115-*b* may identify a number of missing CBs from the downlink transmission 720. The number of missing CBs may be identified, for example, based on CBs that are unsuccessfully decoded at the UE 115-*b*. The UE 115-*b* may transmit a CB request 730 to the base station 105-*b* based on the number of missing CBs.

At block 735, the base station 105-*b* may identify additional CBs for transmission to the UE 115-*b*. The additional CBs may be identified based on the number of missing CBs identified in the CB request 730, for example. The base station 105-*b* may transmit the CBs 740 to the UE 115-*b*.

At block 745, the UE 115-*b* may decode the systematic CBs based on the received systematic and parity CBs. In some examples, the FEC may be used to recover any missing systematic CBs by using the parity CBs, and the UE 115-*b* may successfully decode the downlink transmission without requiring retransmission of any systematic CBs. The UE 115-*b* may transmit ACK/NACK feedback 750 to the base station 105-*b*. In the event that additional CBs are needed, or if the entire TB is to be retransmitted, the base station 105-*b* may format further transmissions to the UE 115-*b*.

Figure 8:
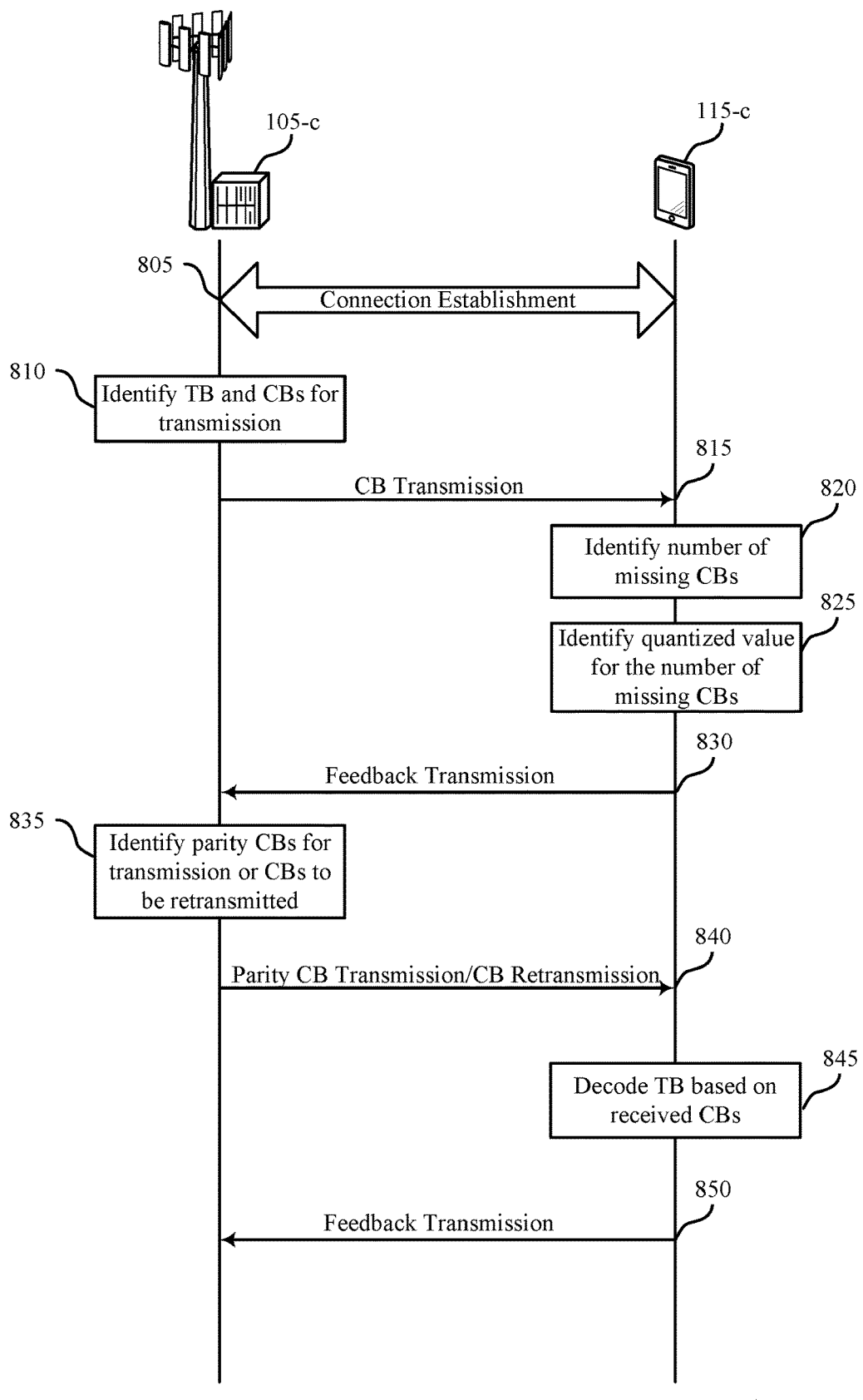
FIG. 8 illustrates an example of another process flow that supports feedback techniques for wireless communications in accordance with aspects of the present disclosure.

FIG. 8 illustrates an example of another process flow 800 that supports feedback techniques for wireless communications in accordance with various aspects of the present disclosure. Process flow 800 may include a base station 105-*c*, and a UE 115-*c*, which may be examples of the corresponding devices described with reference to FIG. 1-2. While the example of FIG. 8 illustrates a downlink transmission from base station 105-*c* to UE 115-*c*, the techniques described herein are equally applicable to uplink transmissions from UE 115-*c* to the base station 105-*c*.

The base station 105-*c* and the UE 115-*c* may establish a connection 805 according to connection establishment techniques for the wireless communications system. At block 810, the base station may identify a TB and CBs for transmission to the UE 115-*c*. In some cases, the base station 105-*c* may encode the CBs to generate systematic CBs and parity CBs, such as discussed above. The base station 105-*c* may transmit a downlink transmission 815 with CBs to the UE 115-*c*.

At block 820, the UE 115-*c* may identify a number of missing CBs from the downlink transmission 815. The number of missing CBs may be identified, for example, based on CBs that are unsuccessfully decoded at the UE 115-*c*. At block 825, the UE 115-*c* may identify a quantized value of the number of CBs needed for decoding the TB. The quantized value may be identified based on a number of quantization levels and the number of missing CBs, for example, as discussed above. The UE 115-*c* may transmit feedback transmission 830 to the base station 105-*c* based on the quantized value.

At block 835, the base station 105-*c* may identify CBs for retransmission, or parity CBs for transmission, to the UE 115-*c*. The number of additional CBs, for example, may be identified based on the quantized value of the number of needed CBs. In some examples, the feedback transmission 830 may indicate to retransmit the TB, and the base station 105-*c* may initiate such a retransmission in such cases. The base station 105-*c* may transmit the CB transmissions or CB retransmissions 840 to the UE 115-*c*.

At block 845, the UE 115-*c* may decode the TB based on received CBs. In some examples, the FEC may be used to recover any missing systematic CBs by using the parity CBs, and the UE 115-*c* may successfully decode the downlink transmission without requiring retransmission of any systematic CBs. The UE 115-*c* may transmit ACK/NACK feedback 850 to the base station 105-*c*.

Figure 9:
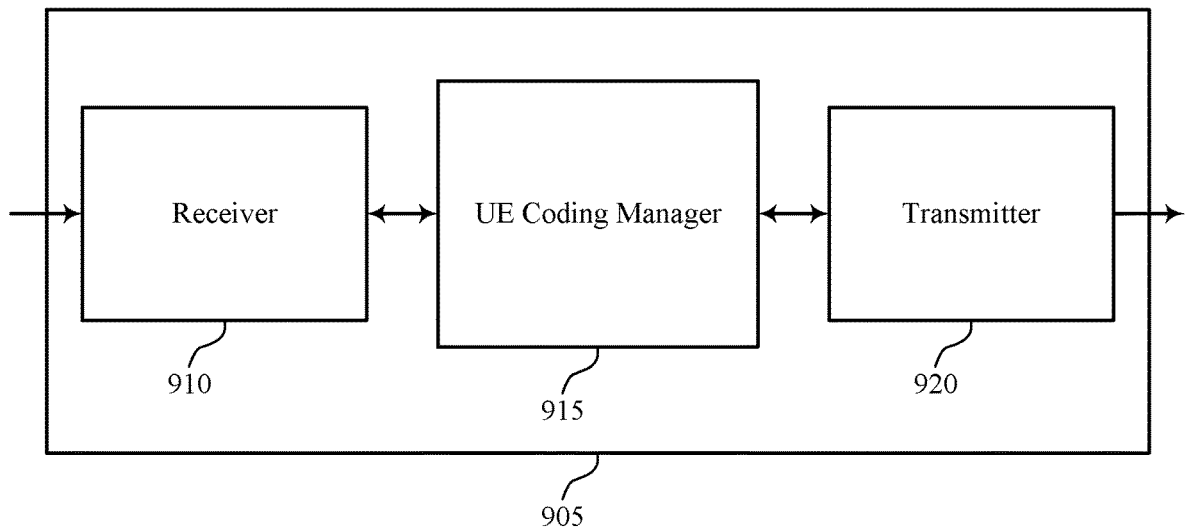
FIGS. 9 through 11 show block diagrams of a device that supports feedback techniques for wireless communications in accordance with aspects of the present disclosure.

FIG. 9 shows a block diagram 900 of a wireless device 905 that supports feedback techniques for wireless communications in accordance with various aspects of the present disclosure. Wireless device 905 may be an example of aspects of a user equipment (UE) 115 as described with reference to FIG. 1. Wireless device 905 may include receiver 910, UE coding manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to feedback techniques for wireless communications, etc.). Information may be passed on to other components of the device. The receiver 910 may be an example of aspects of the transceiver 1235 described with reference to FIG. 12.

UE coding manager 915 may be an example of aspects of the UE coding manager 1215 described with reference to FIG. 12.

UE coding manager 915 and/or at least some of its various sub-components may be implemented in hardware, software executed by a processor, firmware, or any combination thereof. If implemented in software executed by a processor, the functions of the UE coding manager 915 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE coding manager 915 and/or at least some of its various sub-components may be physically located at various positions, including being distributed such that portions of functions are implemented at different physical locations by one or more physical devices. In some examples, UE coding manager 915 and/or at least some of its various sub-components may be a separate and distinct component in accordance with various aspects of the present disclosure. In other examples, UE coding manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE coding manager 915 may receive a transmission including at least a portion of an encoded TB, the TB including systematic CBs and parity CBs, identify a first subset of CBs of the encoded TB that are successfully received and a second subset of CBs of the encoded TB that are unsuccessfully received, and transmit a request for transmission of one or more of the CBs based on the second subset. The UE coding manager 915 may also receive a transmission including a set of CBs, identify a first subset of the set of CBs that are successfully received and a second subset of the set of CBs that are unsuccessfully received, and transmit, to the transmitting device, a quantized value based on the number of CBs in the second subset of CBs that are unsuccessfully received.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may include a single antenna, or it may include a set of antennas.

Figure 10:
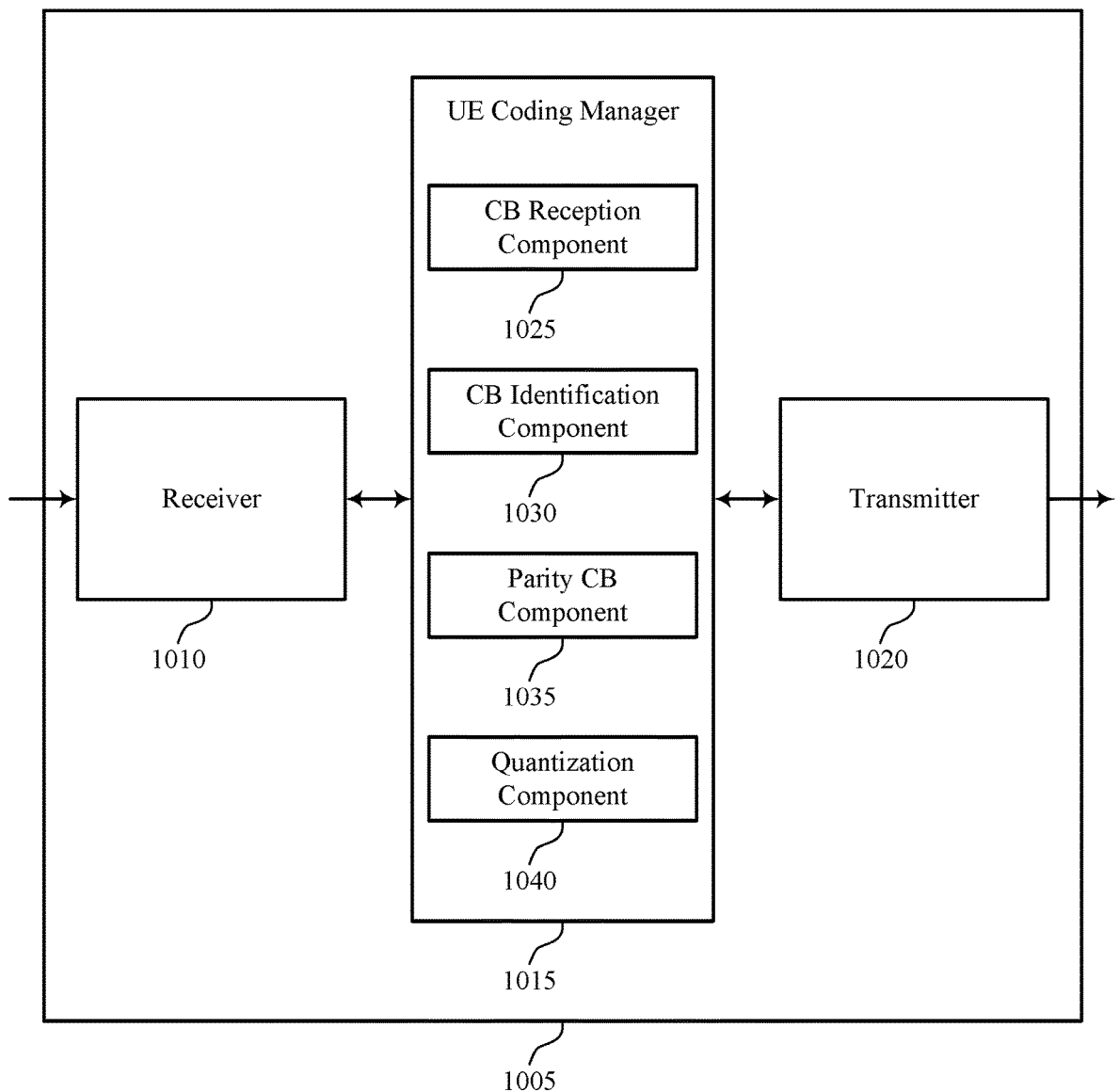

FIG. 10 shows a block diagram 1000 of a wireless device 1005 that supports feedback techniques for wireless communications in accordance with various aspects of the present disclosure. Wireless device 1005 may be an example of aspects of a wireless device 905 or a UE 115 as described with reference to FIGS. 1 and 9. Wireless device 1005 may include receiver 1010, UE coding manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to feedback techniques for wireless communications, etc.). Information may be passed on to other components of the device. The receiver 1010 may be an example of aspects of the transceiver 1235 described with reference to FIG. 12.

UE coding manager 1015 may be an example of aspects of the UE coding manager 1215 described with reference to FIG. 12. UE coding manager 1015 may also include CB reception component 1025, CB identification component 1030, Additional CB component 1035, and quantization component 1040.

CB reception component 1025 may receive a transmission including at least a portion of an encoded TB, the TB including systematic CBs and parity CBs, and receive the one or more CBs responsive to a request for additional CBs. In some cases, a number of the additional CBs is based on the second subset of CBs. The CB reception component 1025 may also receive a retransmission of the encoded TB responsive to a NACK for the TB. In some cases, CB reception component 1025 may receive the retransmission of the TB responsive to the NACK for the TB. In some cases, CB reception component 1025 may receive, responsive to a CB NACK, the one or more CBs, and where the number of CBs is based on one or more retransmissions of one or more CBs of the second subset of CBs. In some cases, the number of CBs included in the retransmission is indicated in one or more of RRC signaling or DCI associated with the retransmission. In some cases, the encoded TB uses a first duration transmission time interval (TTI), and the identifying the second subset of CBs is based on a first portion of the encoded TB being punctured by a second transmission having a second duration TTI that is shorter than the first duration TTI.

CB identification component 1030 may identify a first subset of CBs of the encoded TB that are successfully received and a second subset of CBs of the encoded TB that are unsuccessfully received.

Additional CB component 1035 may transmit a request for transmission of one or more of the additional CBs based on the second subset. In some cases, the CBs are for decoding the encoded TB irrespective of a location of CBs of the second subset of CBs within the encoded TB. In some cases, the transmitting includes transmitting the request in an uplink common burst portion of a downlink-centric subframe.

Quantization component 1040 may determine the quantized feedback value based on a number of CBs in the second subset of CBs and a number of quantization levels associated with the quantized value. In some cases, the number of quantization levels is configured through one or more of RRC signaling or DCI received from the base station. In some cases, the identifying the two or more quantization levels further includes determining whether the quantized value is to be transmitted in an uplink common burst portion of a downlink-centric subframe or in an uplink-centric subframe, and identifying a first number of quantization levels associated with the uplink common burst of the downlink-centric subframe and a second number of quantization levels associated with the uplink-centric subframe. In some cases, the transmitting the quantized value further includes selecting the first number of quantization levels or the second number of quantization levels based on the determining, selecting one of the first number of quantization levels as the quantized value based on a number of CBs in the second subset of CBs when the first number of quantization levels is selected, and selecting one of the second number of quantization levels as the quantized value based on the number of CBs in the second subset of CBs when the second number of quantization levels is selected. In some cases, the identifying the two or more quantization levels includes determining an uplink channel for transmitting the quantized value, and identifying a number of quantization levels of the two or more quantization levels based on the uplink channel. In some cases, the identifying the two or more quantization levels further includes determining that the uplink channel is an uplink control channel, and identifying the number of quantization levels based on a control channel format of the uplink control channel.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may include a single antenna, or it may include a set of antennas.

Figure 11:
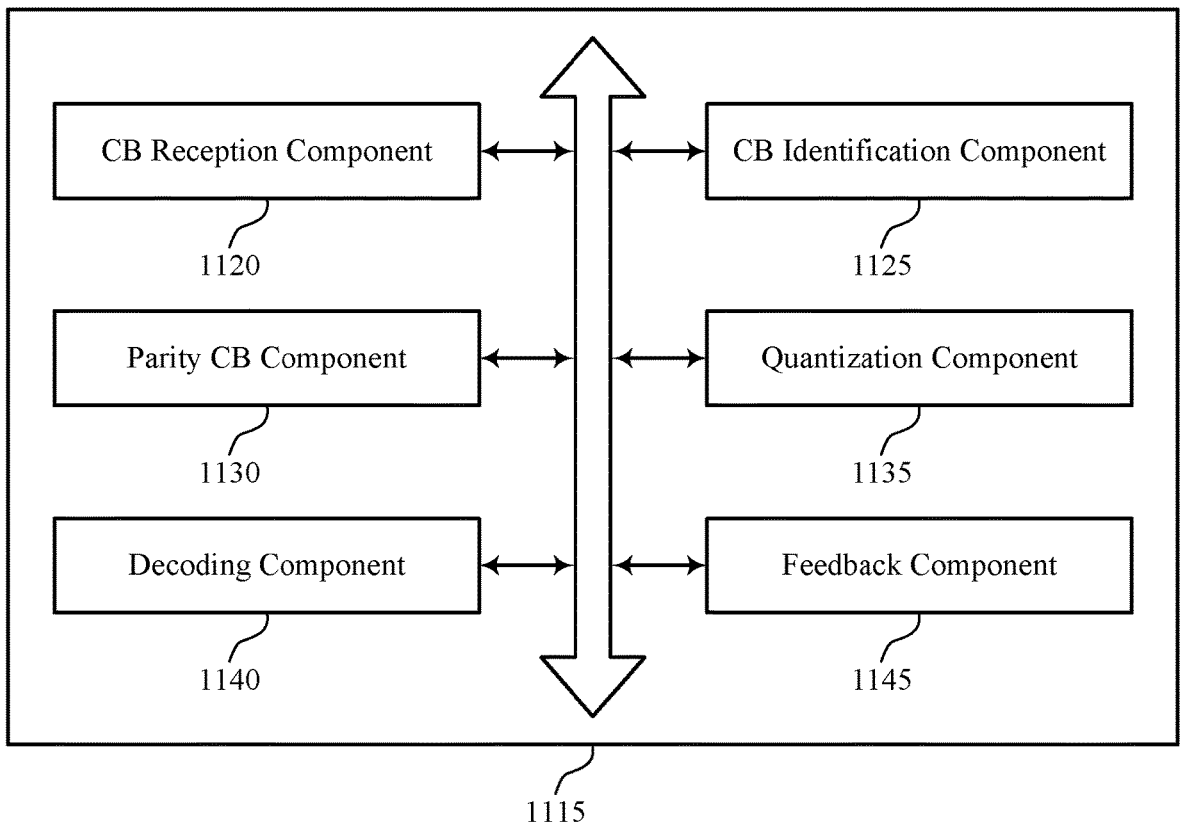

FIG. 11 shows a block diagram 1100 of a UE coding manager 1115 that supports feedback techniques for wireless communications in accordance with various aspects of the present disclosure. The UE coding manager 1115 may be an example of aspects of a UE coding manager 915, a UE coding manager 1015, or a UE coding manager 1215 described with reference to FIGS. 9, 10, and 12. The UE coding manager 1115 may include CB reception component 1120, CB identification component 1125, Additional CB component 1130, quantization component 1135, decoding component 1140, and feedback component 1145. Each of these modules may communicate, directly or indirectly, with one another (e.g., via one or more buses).

CB reception component 1120 may receive a transmission including at least a portion of an encoded TB, the TB including systematic CBs and parity CBs, and receive the one or more CBs responsive to a request for CBs. In some cases, a number of the CBs is based on the second subset of CBs. The CB reception component 1120 may also receive a retransmission of the encoded TB responsive to a NACK for the TB. In some cases, CB reception component 1120 may receive the retransmission of the TB responsive to the NACK for the TB. In some cases, CB reception component 1120 may receive, responsive to a CB NACK, the one or more CBs, and where the number of CBs is based on one or more retransmissions of one or more CBs of the second subset of CBs. In some cases, the number of CBs included in the retransmission is indicated in one or more of RRC signaling or DCI associated with the retransmission. In some cases, the encoded TB uses a first duration transmission time interval (TTI), and the identifying the second subset of CBs is based on a first portion of the encoded TB being punctured by a second transmission having a second duration TTI that is shorter than the first duration TTI.

CB identification component 1125 may identify a first subset of CBs of the encoded TB that are successfully received and a second subset of CBs of the encoded TB that are unsuccessfully received.

Additional CB component 1130 may transmit a request for transmission of one or more of the CBs based on the second subset. In some cases, the CBs are for decoding the encoded TB irrespective of a location of CBs of the second subset of c CBs within the encoded TB. In some cases, the transmitting includes transmitting the request in an uplink common burst portion of a downlink-centric subframe.

Quantization component 1135 may determine the quantized feedback value based on a number of CBs in the second subset of CBs and a number of quantization levels associated with the quantized value. In some cases, the number of quantization levels is configured through one or more of RRC signaling or DCI received from the base station. In some cases, the identifying the two or more quantization levels further includes determining whether the quantized value is to be transmitted in an uplink common burst portion of a downlink-centric subframe or in an uplink-centric subframe, and identifying a first number of quantization levels associated with the uplink common burst of the downlink-centric subframe and a second number of quantization levels associated with the uplink-centric subframe. In some cases, the transmitting the quantized value further includes selecting the first number of quantization levels or the second number of quantization levels based on the determining, selecting one of the first number of quantization levels as the quantized value based on a number of CBs in the second subset of CBs when the first number of quantization levels is selected, and selecting one of the second number of quantization levels as the quantized value based on the number of CBs in the second subset of CBs when the second number of quantization levels is selected. In some cases, the identifying the two or more quantization levels includes determining an uplink channel for transmitting the quantized value, and identifying a number of quantization levels of the two or more quantization levels based on the uplink channel. In some cases, the identifying the two or more quantization levels further includes determining that the uplink channel is an uplink control channel, and identifying the number of quantization levels based on a control channel format of the uplink control channel.

Decoding component 1140 may decode the encoded TB based on the first subset of systematic CBs and the received parity CBs in an absence of a retransmission the second subset of CBs. In some cases, the decoding is based on an outer-code that is applied to each systematic CB of the first subset of CBs and the one or more parity CBs.

Feedback component 1145 may transmit a NACK for the encoded TB when a number of CBs of the second subset of CBs exceed a threshold. In some cases, the set of CBs form a TB, and a NACK may be transmitted for the TB when a number of CBs of the second subset of CBs exceed a threshold. In some cases, the transmitting the quantized value includes comparing a number of CBs of the second subset of CBs to a threshold value, transmitting a CB negative acknowledgment (NACK) when the number of CBs is below the threshold value to request one or more CBs for use in decoding the first subset of CBs and the second subset of CBs, and transmitting a TB NACK when the number of CBs is at or above the threshold value to request of retransmission of all of the set of CBs.

Figure 12:
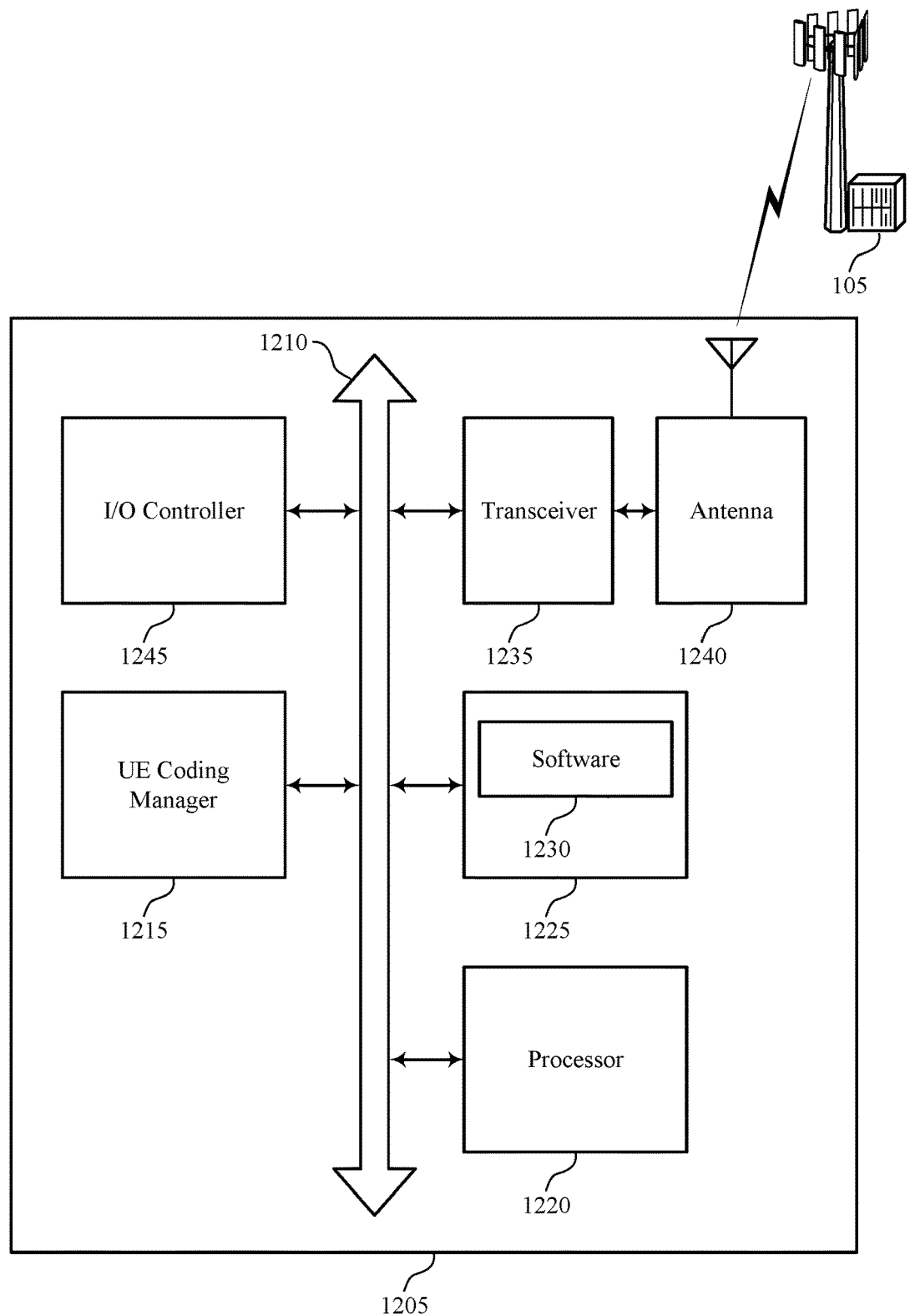
FIG. 12 illustrates a block diagram of a system including a user equipment (UE) that supports feedback techniques for wireless communications in accordance with aspects of the present disclosure.

FIG. 12 shows a diagram of a system 1200 including a device 1205 that supports feedback techniques for wireless communications in accordance with various aspects of the present disclosure. Device 1205 may be an example of or include the components of wireless device 905, wireless device 1005, or a UE 115 as described above, e.g., with reference to FIGS. 1, 9 and 10. Device 1205 may include components for bi-directional voice and data communications including components for transmitting and receiving communications, including UE coding manager 1215, processor 1220, memory 1225, software 1230, transceiver 1235, antenna 1240, and I/O controller 1245. These components may be in electronic communication via one or more busses (e.g., bus 1210). Device 1205 may communicate wirelessly with one or more base stations 105.

Processor 1220 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting feedback techniques for wireless communications).

Memory 1225 may include random access memory (RAM) and read only memory (ROM). The memory 1225 may store computer-readable, computer-executable software 1230 including instructions that, when executed, cause the processor to perform various functions described herein. In some cases, the memory 1225 may contain, among other things, a basic input/output system (BIOS) which may control basic hardware and/or software operation such as the interaction with peripheral components or devices.

Software 1230 may include code to implement aspects of the present disclosure, including code to support feedback techniques for wireless communications. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system. In other cases, I/O controller 1245 may represent or interact with a modem, a keyboard, a mouse, a touchscreen, or a similar device. In some cases, I/O controller 1245 may be implemented as part of a processor. In some cases, a user may interact with device 1205 via I/O controller 1245 or via hardware components controlled by I/O controller 1245.

Figure 13:
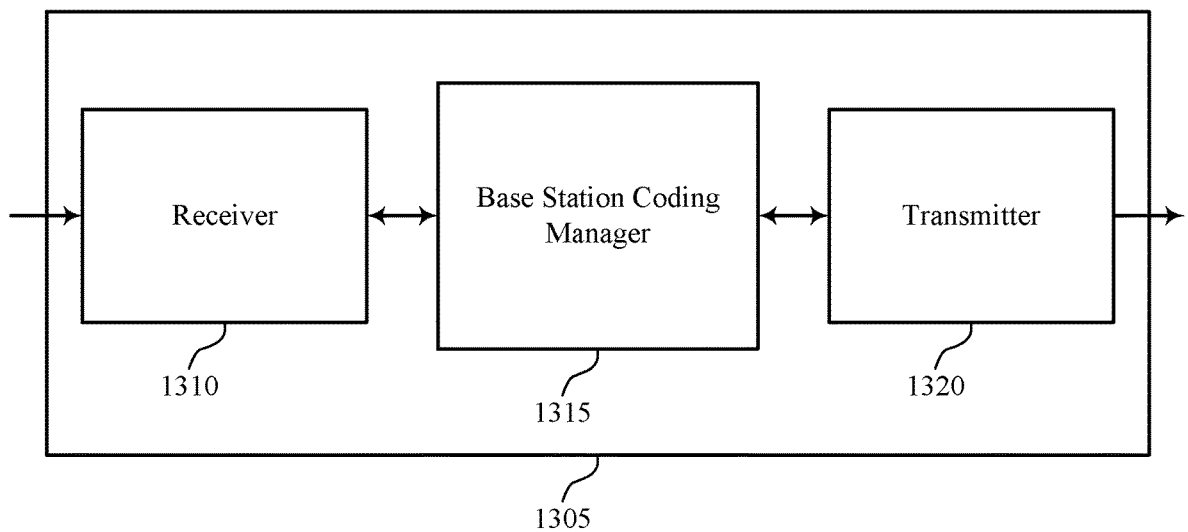
FIGS. 13 through 15 show block diagrams of a device that supports feedback techniques for wireless communications in accordance with aspects of the present disclosure.

FIG. 13 shows a block diagram 1300 of a wireless device 1305 that supports feedback techniques for wireless communications in accordance with various aspects of the present disclosure. Wireless device 1305 may be an example of aspects of a base station 105 as described with reference to FIG. 1. Wireless device 1305 may include receiver 1310, base station coding manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to feedback techniques for wireless communications, etc.). Information may be passed on to other components of the device. The receiver 1310 may be an example of aspects of the transceiver 1635 described with reference to FIG. 16.

Base station coding manager 1315 may be an example of aspects of the base station coding manager 1615 described with reference to FIG. 16.

Base station coding manager 1315 and/or at least some of its various sub-components may be implemented in hardware, software executed by a processor, firmware, or any combination thereof. If implemented in software executed by a processor, the functions of the base station coding manager 1315 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station coding manager 1315 and/or at least some of its various sub-components may be physically located at various positions, including being distributed such that portions of functions are implemented at different physical locations by one or more physical devices. In some examples, base station coding manager 1315 and/or at least some of its various sub-components may be a separate and distinct component in accordance with various aspects of the present disclosure. In other examples, base station coding manager 1315 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station coding manager 1315 may transmit, to a UE, a transmission including at least a portion of an encoded TB, the encoded TB including systematic CBs and parity CBs, receive a request from the UE for transmission of one or more CBs, the request indicating that one or more systematic CBs of the encoded TB are unsuccessfully received, and transmit the one or more additional CBs to the UE for use in decoding the encoded TB. The base station coding manager 1315 may also transmit a set of CBs to a UE, receive, from the UE, a quantized value indicating that a subset of the CBs are unsuccessfully received at the UE, and transmit one or more of an additional CB or a retransmission of one or more CBs based on the quantized value.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1635 described with reference to FIG. 16. The transmitter 1320 may include a single antenna, or it may include a set of antennas.

Figure 14:
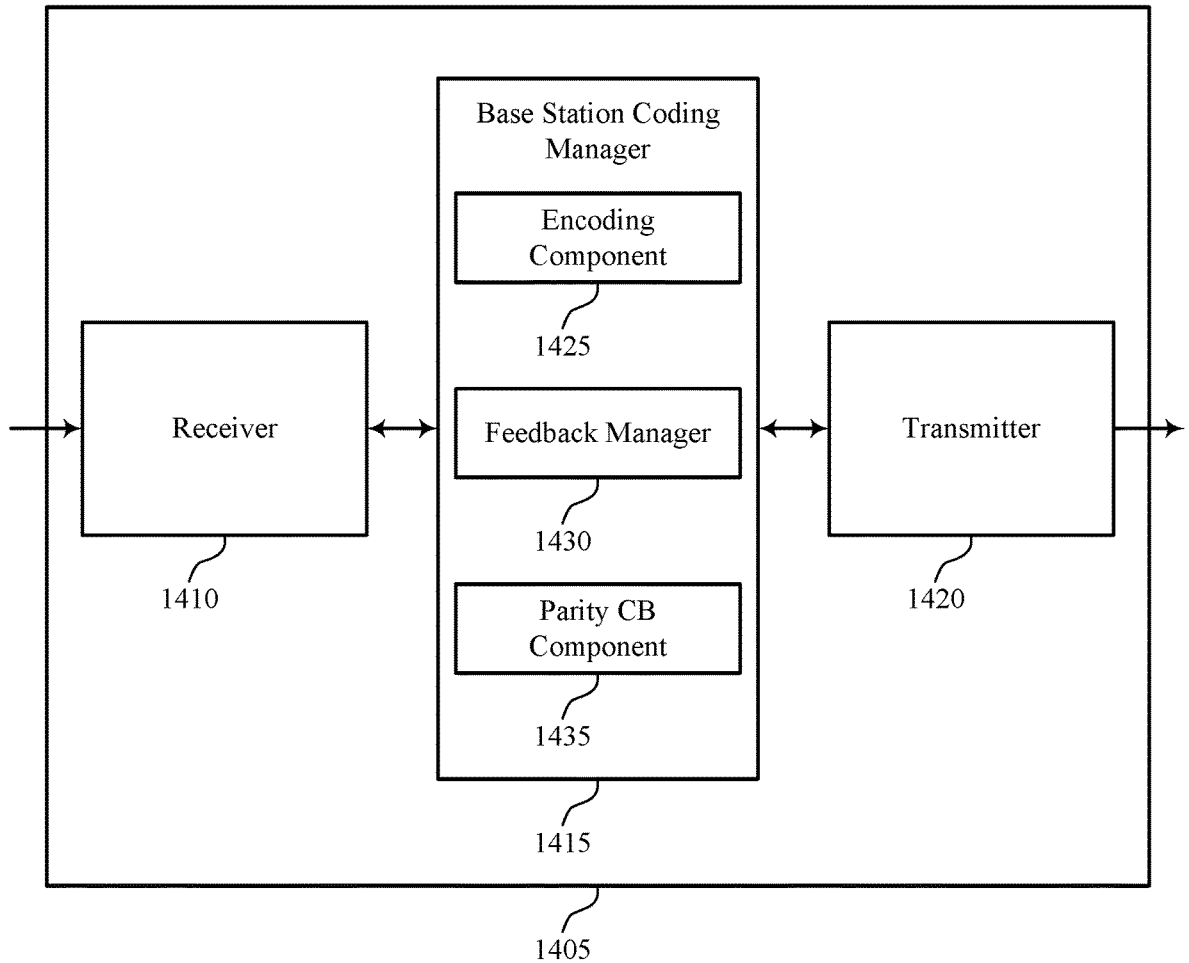

FIG. 14 shows a block diagram 1400 of a wireless device 1405 that supports feedback techniques for wireless communications in accordance with various aspects of the present disclosure. Wireless device 1405 may be an example of aspects of a wireless device 1305 or a base station 105 as described with reference to FIGS. 1 and 13. Wireless device 1405 may include receiver 1410, base station coding manager 1415, and transmitter 1420. Wireless device 1405 may also include a processor. Each of these components may be in communication with one another (e.g., via one or more buses).

Receiver 1410 may receive information such as packets, user data, or control information associated with various information channels (e.g., control channels, data channels, and information related to feedback techniques for wireless communications, etc.). Information may be passed on to other components of the device. The receiver 1410 may be an example of aspects of the transceiver 1635 described with reference to FIG. 16.

Base station coding manager 1415 may be an example of aspects of the base station coding manager 1615 described with reference to FIG. 16. Base station coding manager 1415 may also include encoding component 1425, feedback manager 1430, and Additional CB component 1435.

Encoding component 1425 may apply an outer-code to each systematic CB of an unencoded TB to generate the encoded TB, and where the outer-code and the one or more parity CBs allow the UE to decode the encoded TB when one or more systematic CBs of the encoded TB are not successfully received at the UE. Encoding component 1425 may also transmit, to a UE, a transmission including at least a portion of an encoded TB, the encoded TB including systematic CBs and parity CBs.

Feedback manager 1430 may receive a request from the UE for transmission of one or more of the CBs, the request indicating that one or more CBs of the encoded TB are unsuccessfully received, and transmit one or more CBs responsive thereto. In some cases, feedback manager 1430 may transmit, responsive to a TB NACK, a retransmission of an encoded TB that includes the set of CBs and one or more parity CBs, and where a number of parity CBs included in the retransmission is indicated in one or more of RRC signaling or DCI associated with the retransmission. In some cases, a NACK may be received for the encoded TB when a number of CBs of the second subset of CBs exceed a threshold, and a retransmission of the encoded TB is transmitted responsive to the NACK. In some cases, an ACK may be received from the UE indicating successful receipt of the encoded TB in an absence of a retransmission of the one or more CBs of the TB that are unsuccessfully received. In some cases, feedback manager 1430 may determine that the quantized value indicates a CB NACK, and transmit, responsive to the CB NACK, one or more CBs, and where a number of the CBs is based on one or more retransmissions of one or more CBs of the subset of the CBs. In some cases, feedback manager 1430 may determine that the quantized value indicates a TB NACK. In some cases, the receiving includes receiving the request in an uplink common burst portion of a downlink-centric subframe.

Additional CB component 1435 may transmit the one or more CBs to the UE for use in decoding the encoded TB and transmit one or more of a CB or a retransmission of one or more CBs based on the quantized value.

Transmitter 1420 may transmit signals generated by other components of the device. In some examples, the transmitter 1420 may be collocated with a receiver 1410 in a transceiver module. For example, the transmitter 1420 may be an example of aspects of the transceiver 1635 described with reference to FIG. 16. The transmitter 1420 may include a single antenna, or it may include a set of antennas.

Figure 15:
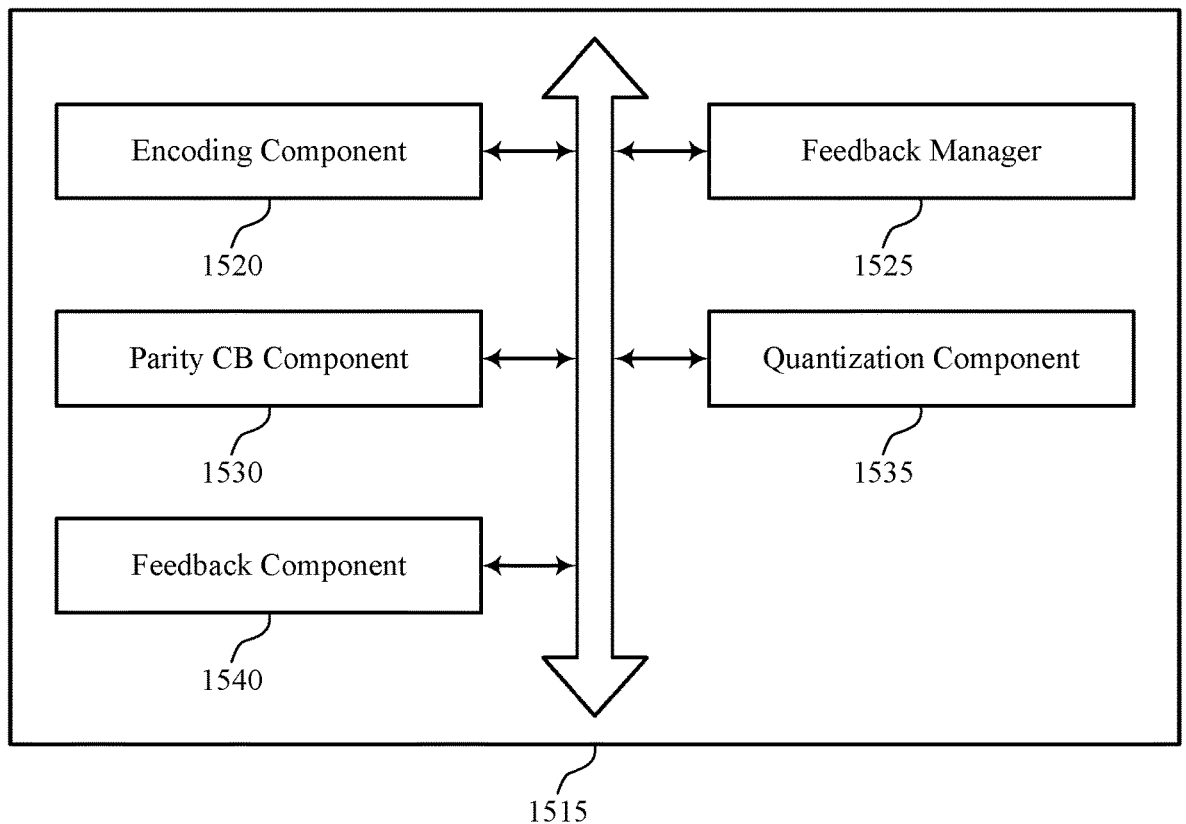

FIG. 15 shows a block diagram 1500 of a base station coding manager 1515 that supports feedback techniques for wireless communications in accordance with various aspects of the present disclosure. The base station coding manager 1515 may be an example of aspects of a base station coding manager 1615 described with reference to FIGS. 13, 14, and 16. The base station coding manager 1515 may include encoding component 1520, feedback manager 1525, Additional CB component 1530, quantization component 1535, and feedback component 1540. Each of these modules may communicate, directly or indirectly, with one another (e.g., via one or more buses).

Encoding component 1520 may apply an outer-code to each systematic CB of an unencoded TB to generate the encoded TB, and where the outer-code and the one or more parity CBs allow the UE to decode the encoded TB when one or more systematic CBs of the encoded TB are not successfully received at the UE. Encoding component 1520 may also transmit, to a UE, a transmission including at least a portion of an encoded TB, the encoded TB including systematic CBs and parity CBs.

Feedback manager 1525 may receive a request from the UE for transmission of one or more of the CBs, the request indicating that one or more CBs of the encoded TB are unsuccessfully received, and transmit one or more CBs responsive thereto. In some cases, feedback manager 1525 may transmit, responsive to a TB NACK, a retransmission of an encoded TB that includes the set of CBs and one or more parity CBs, and where a number of parity CBs included in the retransmission is indicated in one or more of RRC signaling or DCI associated with the retransmission. In some cases, a NACK may be received for the encoded TB when a number of CBs of the second subset of CBs exceed a threshold, and a retransmission of the encoded TB is transmitted responsive to the NACK. In some cases, an ACK may be received from the UE indicating successful receipt of the encoded TB in an absence of a retransmission of the one or more CBs of the TB that are unsuccessfully received. In some cases, feedback manager 1525 may determine that the quantized value indicates a CB NACK, and transmit, responsive to the CB NACK, one or more CBs, and where a number of the CBs is based on one or more retransmissions of one or more CBs of the subset of the CBs. In some cases, feedback manager 1525 may determine that the quantized value indicates a TB NACK. In some cases, the receiving includes receiving the request in an uplink common burst portion of a downlink-centric subframe.

Additional CB component 1530 may transmit the one or more CBs to the UE for use in decoding the encoded TB and transmit one or more of a CB or a retransmission of one or more CBs based on the quantized value.

Quantization component 1535 may configure, at the UE, the number of quantization levels through one or more of RRC signaling or DCI, and configure the UE with two or more quantization levels for the quantized value based on a number of CBs of the set of CBs. In some cases, the quantized value is based on a number of CBs in the subset of the CBs and a number of quantization levels associated with the quantized value. In some cases, the two or more quantization levels are based on one or more of: an uplink transmission used for transmitting the quantized value, an uplink channel for transmitting the quantized value, a control channel format of an uplink control channel for transmitting the quantized value, or a length of an uplink TTI used to transmit the quantized value. Feedback component 1540 may transmit a retransmission of the TB responsive to the NACK for the TB.

Figure 16:
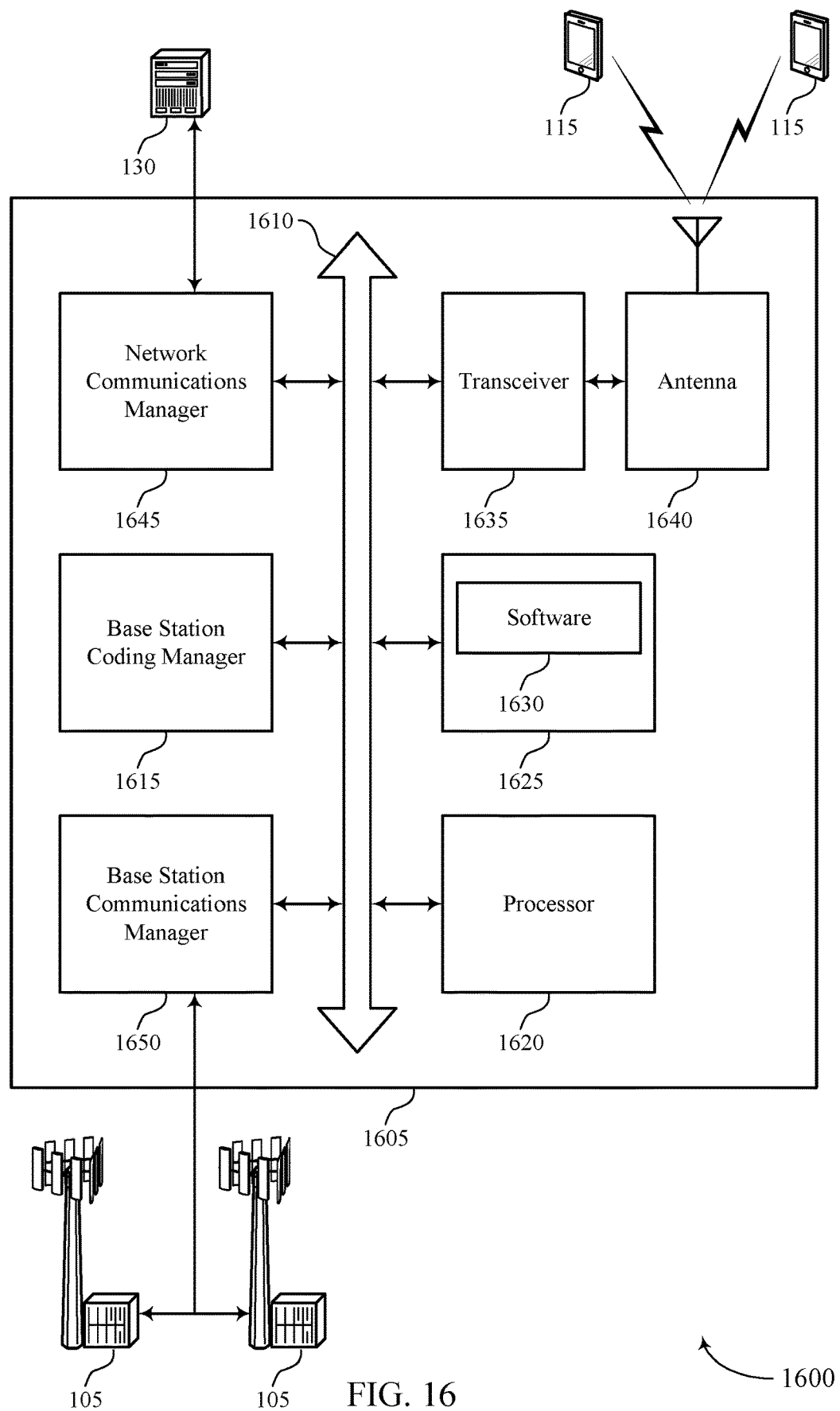
FIG. 16 illustrates a block diagram of a system including a base station that supports feedback techniques for wireless communications in accordance with aspects of the present disclosure.

FIG. 16 shows a diagram of a system 1600 including a device 1605 that supports feedback techniques for wireless communications in accordance with various aspects of the present disclosure. Device 1605 may be an example of or include the components of base station 105 as described above, e.g., with reference to FIG. 1. Device 1605 may include components for bi-directional voice and data communications including components for transmitting and receiving communications, including base station coding manager 1615, processor 1620, memory 1625, software 1630, transceiver 1635, antenna 1640, network communications manager 1645, and base station communications manager 1650. These components may be in electronic communication via one or more busses (e.g., bus 1610). Device 1605 may communicate wirelessly with one or more UEs 115.

Processor 1620 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1620 may be configured to operate a memory array using a memory controller. In other cases, a memory controller may be integrated into processor 1620. Processor 1620 may be configured to execute computer-readable instructions stored in a memory to perform various functions (e.g., functions or tasks supporting feedback techniques for wireless communications).

Memory 1625 may include RAM and ROM. The memory 1625 may store computer-readable, computer-executable software 1630 including instructions that, when executed, cause the processor to perform various functions described herein. In some cases, the memory 1625 may contain, among other things, a BIOS which may control basic hardware and/or software operation such as the interaction with peripheral components or devices.

Software 1630 may include code to implement aspects of the present disclosure, including code to support feedback techniques for wireless communications. Software 1630 may be stored in a non-transitory computer-readable medium such as system memory or other memory. In some cases, the software 1630 may not be directly executable by the processor but may cause a computer (e.g., when compiled and executed) to perform functions described herein.

Transceiver 1635 may communicate bi-directionally, via one or more antennas, wired, or wireless links as described above. For example, the transceiver 1635 may represent a wireless transceiver and may communicate bi-directionally with another wireless transceiver. The transceiver 1635 may also include a modem to modulate the packets and provide the modulated packets to the antennas for transmission, and to demodulate packets received from the antennas.

In some cases, the wireless device may include a single antenna 1640. However, in some cases the device may have more than one antenna 1640, which may be capable of concurrently transmitting or receiving multiple wireless transmissions.

Network communications manager 1645 may manage communications with the core network (e.g., via one or more wired backhaul links). For example, the network communications manager 1645 may manage the transfer of data communications for client devices, such as one or more UEs 115.

Base station communications manager 1650 may manage communications with other base station 105, and may include a controller or scheduler for controlling communications with UEs 115 in cooperation with other base stations 105. For example, the base station communications manager 1650 may coordinate scheduling for transmissions to UEs 115 for various interference mitigation techniques such as beamforming or joint transmission. In some examples, base station communications manager 1650 may provide an X2 interface within an Long Term Evolution (LTE)/LTE-A wireless communication network technology to provide communication between base stations 105.

Figure 17:
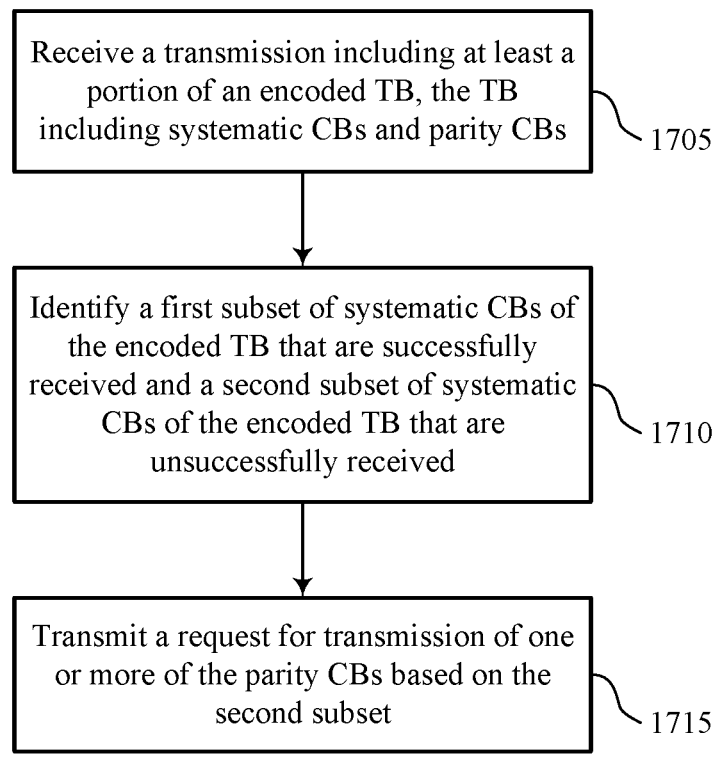
FIGS. 17 through 23 illustrate methods for feedback techniques for wireless communications in accordance with aspects of the present disclosure.

FIG. 17 shows a flowchart illustrating a method 1700 for feedback techniques for wireless communications in accordance with various aspects of the present disclosure. The operations of method 1700 may be implemented by a UE 115 or its components as described herein. For example, the operations of method 1700 may be performed by a UE coding manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 1705 the UE 115 may receive a transmission comprising at least a portion of an encoded TB, the TB comprising systematic CBs and parity CBs. The operations of block 1705 may be performed according to the methods described with reference to FIGS. 1 through 8. In certain examples, aspects of the operations of block 1705 may be performed by a CB reception component as described with reference to FIGS. 9 through 12.

At block 1710 the UE 115 may identify a first subset of CBs of the encoded TB that are successfully received and a second subset of CBs of the encoded TB that are unsuccessfully received. The operations of block 1710 may be performed according to the methods described with reference to FIGS. 1 through 8. In certain examples, aspects of the operations of block 1710 may be performed by a CB identification component as described with reference to FIGS. 9 through 12.

At block 1715 the UE 115 may transmit a request for transmission of one or more of the CBs based at least in part on the second subset. The operations of block 1715 may be performed according to the methods described with reference to FIGS. 1 through 8. In certain examples, aspects of the operations of block 1715 may be performed by an additional CB component as described with reference to FIGS. 9 through 12.

Figure 18:
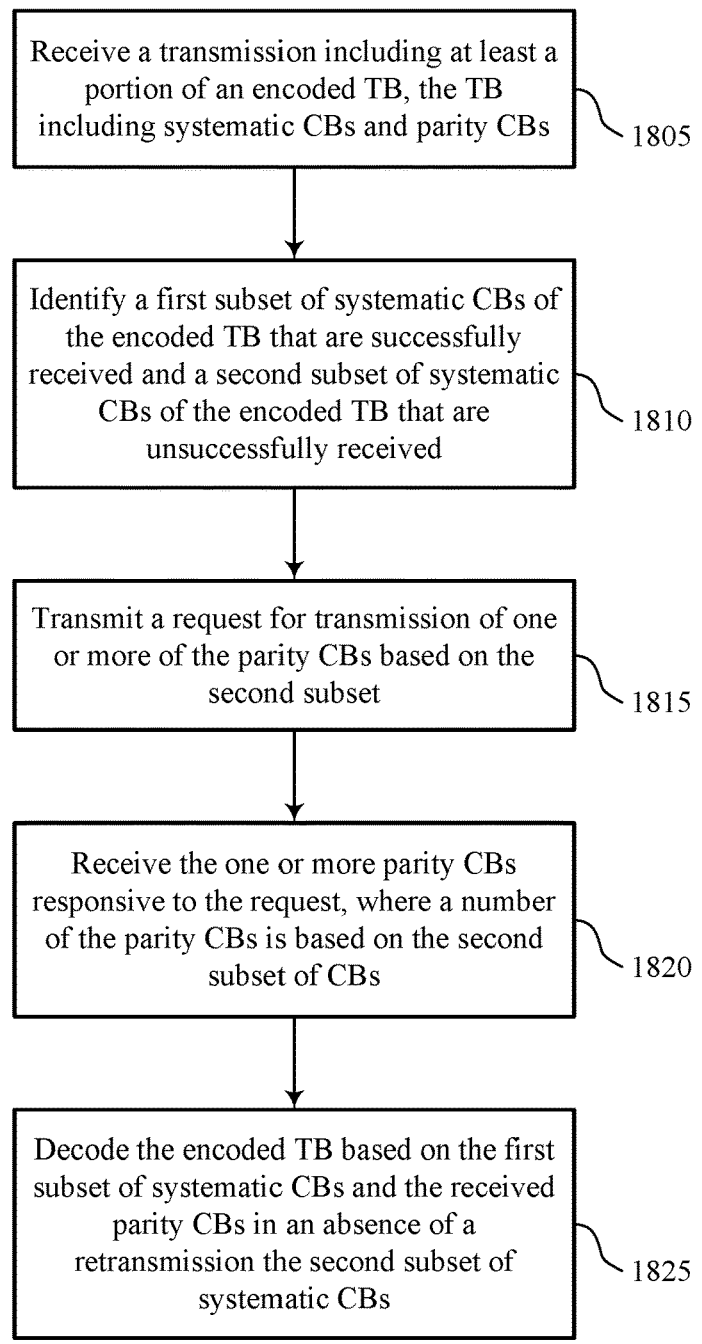

FIG. 18 shows a flowchart illustrating a method 1800 for feedback techniques for wireless communications in accordance with various aspects of the present disclosure. The operations of method 1800 may be implemented by a UE 115 or its components as described herein. For example, the operations of method 1800 may be performed by a UE coding manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 1805 the UE 115 may receive a transmission comprising at least a portion of an encoded TB, the TB comprising systematic CBs and parity CBs. The operations of block 1805 may be performed according to the methods described with reference to FIGS. 1 through 8. In certain examples, aspects of the operations of block 1805 may be performed by a CB reception component as described with reference to FIGS. 9 through 12.

At block 1810 the UE 115 may identify a first subset of CBs of the encoded TB that are successfully received and a second subset of CBs of the encoded TB that are unsuccessfully received. The operations of block 1810 may be performed according to the methods described with reference to FIGS. 1 through 8. In certain examples, aspects of the operations of block 1810 may be performed by a CB identification component as described with reference to FIGS. 9 through 12.

At block 1815 the UE 115 may transmit a request for transmission of one or more of the CBs based at least in part on the second subset. The operations of block 1815 may be performed according to the methods described with reference to FIGS. 1 through 8. In certain examples, aspects of the operations of block 1815 may be performed by an additional CB component as described with reference to FIGS. 9 through 12.

At block 1820 the UE 115 may receive the one or more CBs responsive to the request, wherein a number of the CBs is based at least in part on the second subset of CBs. The operations of block 1820 may be performed according to the methods described with reference to FIGS. 1 through 8. In certain examples, aspects of the operations of block 1820 may be performed by a CB reception component as described with reference to FIGS. 9 through 12.

At block 1825 the UE 115 may decode the encoded TB based at least in part on the first subset of systematic CBs and the received parity CBs in an absence of a retransmission the second subset of CBs. The operations of block 1825 may be performed according to the methods described with reference to FIGS. 1 through 8. In certain examples, aspects of the operations of block 1825 may be performed by a decoding component as described with reference to FIGS. 9 through 12.

Figure 19:
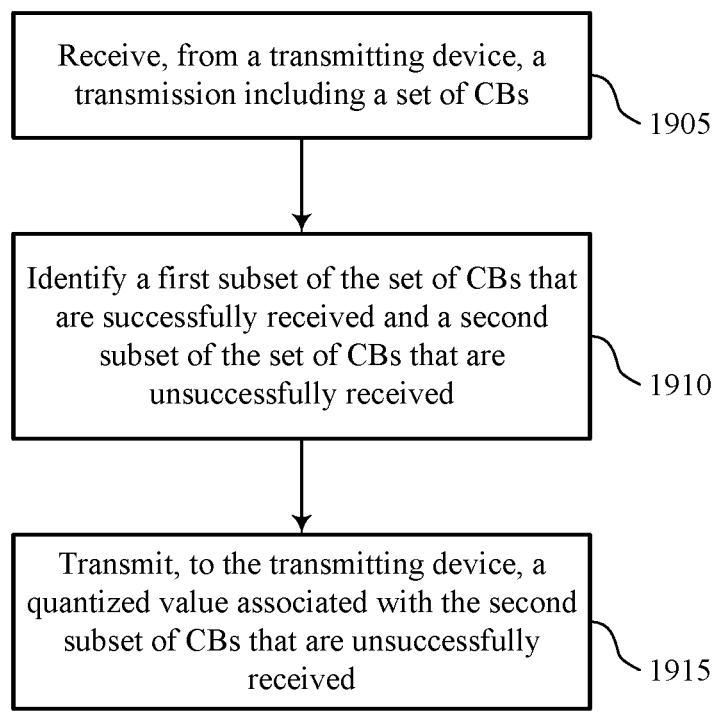

FIG. 19 shows a flowchart illustrating a method 1900 for feedback techniques for wireless communications in accordance with various aspects of the present disclosure. The operations of method 1900 may be implemented by a UE 115 or its components as described herein. For example, the operations of method 1900 may be performed by a UE coding manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 1905 the UE 115 may receive, from a transmitting device, a transmission comprising a plurality of CBs. The operations of block 1905 may be performed according to the methods described with reference to FIGS. 1 through 8. In certain examples, aspects of the operations of block 1905 may be performed by a CB reception component as described with reference to FIGS. 9 through 12.

At block 1910 the UE 115 may identify a first subset of the plurality of CBs that are successfully received and a second subset of the plurality of CBs that are unsuccessfully received. The operations of block 1910 may be performed according to the methods described with reference to FIGS. 1 through 8. In certain examples, aspects of the operations of block 1910 may be performed by a CB identification component as described with reference to FIGS. 9 through 12.

At block 1915 the UE 115 may transmit, to the transmitting device, a quantized value associated with the second subset of CBs that are unsuccessfully received. The operations of block 1915 may be performed according to the methods described with reference to FIGS. 1 through 8. In certain examples, aspects of the operations of block 1915 may be performed by a quantization component as described with reference to FIGS. 9 through 12.

Figure 20:
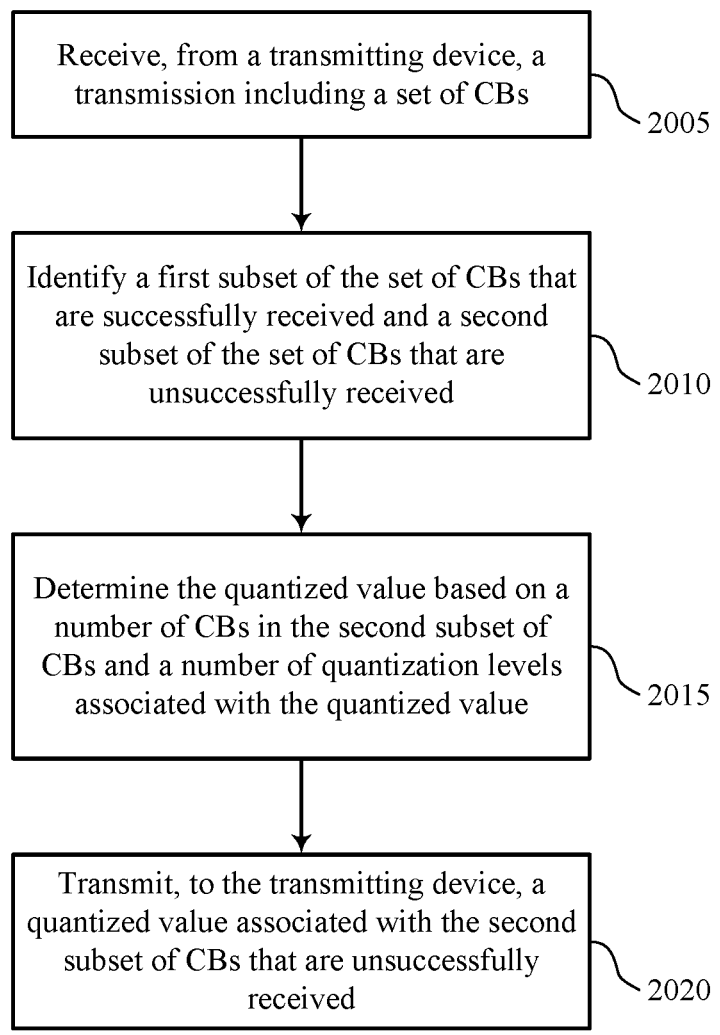

FIG. 20 shows a flowchart illustrating a method 2000 for feedback techniques for wireless communications in accordance with various aspects of the present disclosure. The operations of method 2000 may be implemented by a UE 115 or its components as described herein. For example, the operations of method 2000 may be performed by a UE coding manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 2005 the UE 115 may receive, from a transmitting device, a transmission comprising a plurality of CBs. The operations of block 2005 may be performed according to the methods described with reference to FIGS. 1 through 8. In certain examples, aspects of the operations of block 2005 may be performed by a CB reception component as described with reference to FIGS. 9 through 12.

At block 2010 the UE 115 may identify a first subset of the plurality of CBs that are successfully received and a second subset of the plurality of CBs that are unsuccessfully received. The operations of block 2010 may be performed according to the methods described with reference to FIGS. 1 through 8. In certain examples, aspects of the operations of block 2010 may be performed by a CB identification component as described with reference to FIGS. 9 through 12.

At block 2015 the UE 115 may determine the quantized value based at least in part on a number of CBs in the second subset of CBs and a number of quantization levels associated with the quantized value. The operations of block 2015 may be performed according to the methods described with reference to FIGS. 1 through 8. In certain examples, aspects of the operations of block 2015 may be performed by a quantization component as described with reference to FIGS. 9 through 12.

At block 2020 the UE 115 may transmit, to the transmitting device, a quantized value associated with the second subset of CBs that are unsuccessfully received. The operations of block 2020 may be performed according to the methods described with reference to FIGS. 1 through 8. In certain examples, aspects of the operations of block 2020 may be performed by a quantization component as described with reference to FIGS. 9 through 12.

Figure 21:
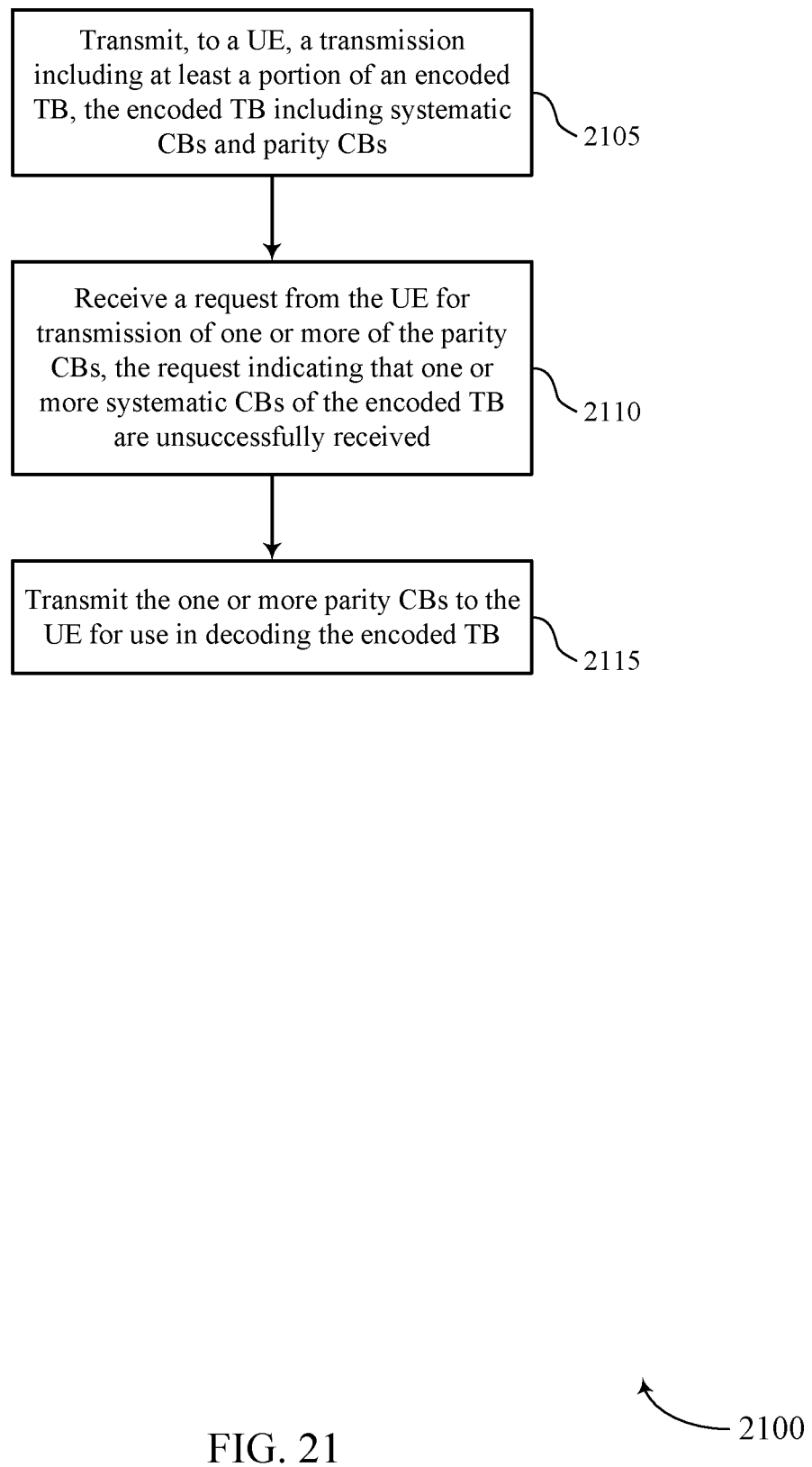

FIG. 21 shows a flowchart illustrating a method 2100 for feedback techniques for wireless communications in accordance with various aspects of the present disclosure. The operations of method 2100 may be implemented by a base station 105 or its components as described herein. For example, the operations of method 2100 may be performed by a base station coding manager as described with reference to FIGS. 13 through 16. In some examples, a base station 105 may execute a set of codes to control the functional elements of the device to perform the functions described below. Additionally or alternatively, the base station 105 may perform aspects of the functions described below using special-purpose hardware.

At block 2105 the base station 105 may transmit, to a UE, a transmission comprising at least a portion of an encoded TB, the encoded TB comprising systematic CBs and parity CBs. The operations of block 2105 may be performed according to the methods described with reference to FIGS. 1 through 8. In certain examples, aspects of the operations of block 2105 may be performed by a encoding component as described with reference to FIGS. 13 through 16.

At block 2110 the base station 105 may receive a request from the UE for transmission of one or more of the CBs, the request indicating that one or more CBs of the encoded TB are unsuccessfully received. The operations of block 2110 may be performed according to the methods described with reference to FIGS. 1 through 8. In certain examples, aspects of the operations of block 2110 may be performed by a feedback manager as described with reference to FIGS. 13 through 16.

At block 2115 the base station 105 may transmit the one or more CBs to the UE for use in decoding the encoded TB. The operations of block 2115 may be performed according to the methods described with reference to FIGS. 1 through 8. In certain examples, aspects of the operations of block 2115 may be performed by an additional CB component as described with reference to FIGS. 13 through 16.

Figure 22:
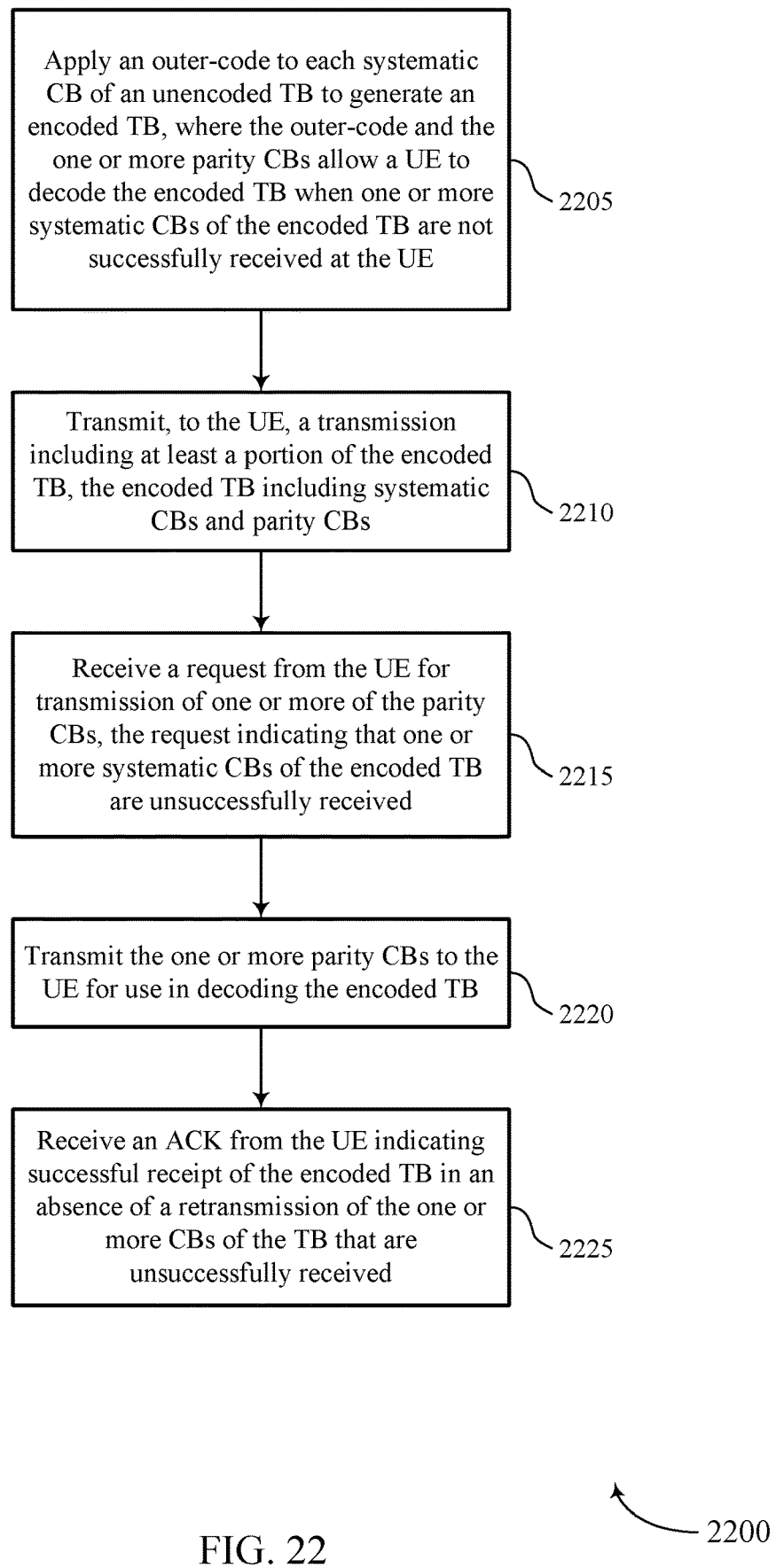

FIG. 22 shows a flowchart illustrating a method 2200 for feedback techniques for wireless communications in accordance with various aspects of the present disclosure. The operations of method 2200 may be implemented by a base station 105 or its components as described herein. For example, the operations of method 2200 may be performed by a base station coding manager as described with reference to FIGS. 13 through 16. In some examples, a base station 105 may execute a set of codes to control the functional elements of the device to perform the functions described below. Additionally or alternatively, the base station 105 may perform aspects of the functions described below using special-purpose hardware.

At block 2205 the base station 105 may apply an outer-code to each systematic CB of an unencoded TB to generate the encoded TB, and wherein the outer-code and the one or more parity CBs allow the UE to decode the encoded TB when one or more CBs of the encoded TB are not successfully received at the UE. The operations of block 2205 may be performed according to the methods described with reference to FIGS. 1 through 8. In certain examples, aspects of the operations of block 2205 may be performed by a encoding component as described with reference to FIGS. 13 through 16.

At block 2210 the base station 105 may transmit, to a UE, a transmission comprising at least a portion of an encoded TB, the encoded TB comprising systematic CBs and parity CBs. The operations of block 2210 may be performed according to the methods described with reference to FIGS. 1 through 8. In certain examples, aspects of the operations of block 2210 may be performed by a encoding component as described with reference to FIGS. 13 through 16.

At block 2215 the base station 105 may receive a request from the UE for transmission of one or more of the CBs, the request indicating that one or more CBs of the encoded TB are unsuccessfully received. The operations of block 2215 may be performed according to the methods described with reference to FIGS. 1 through 8. In certain examples, aspects of the operations of block 2215 may be performed by a feedback manager as described with reference to FIGS. 13 through 16.

At block 2220 the base station 105 may transmit the one or more CBs to the UE for use in decoding the encoded TB. The operations of block 2220 may be performed according to the methods described with reference to FIGS. 1 through 8. In certain examples, aspects of the operations of block 2220 may be performed by an additional CB component as described with reference to FIGS. 13 through 16.

At block 2225 the base station 105 may receive an ACK from the UE indicating successful receipt of the encoded TB in an absence of a retransmission of the one or more CBs of the TB that are unsuccessfully received. The operations of block 2225 may be performed according to the methods described with reference to FIGS. 1 through 8. In certain examples, aspects of the operations of block 2225 may be performed by a feedback manager as described with reference to FIGS. 13 through 16.

Figure 23:
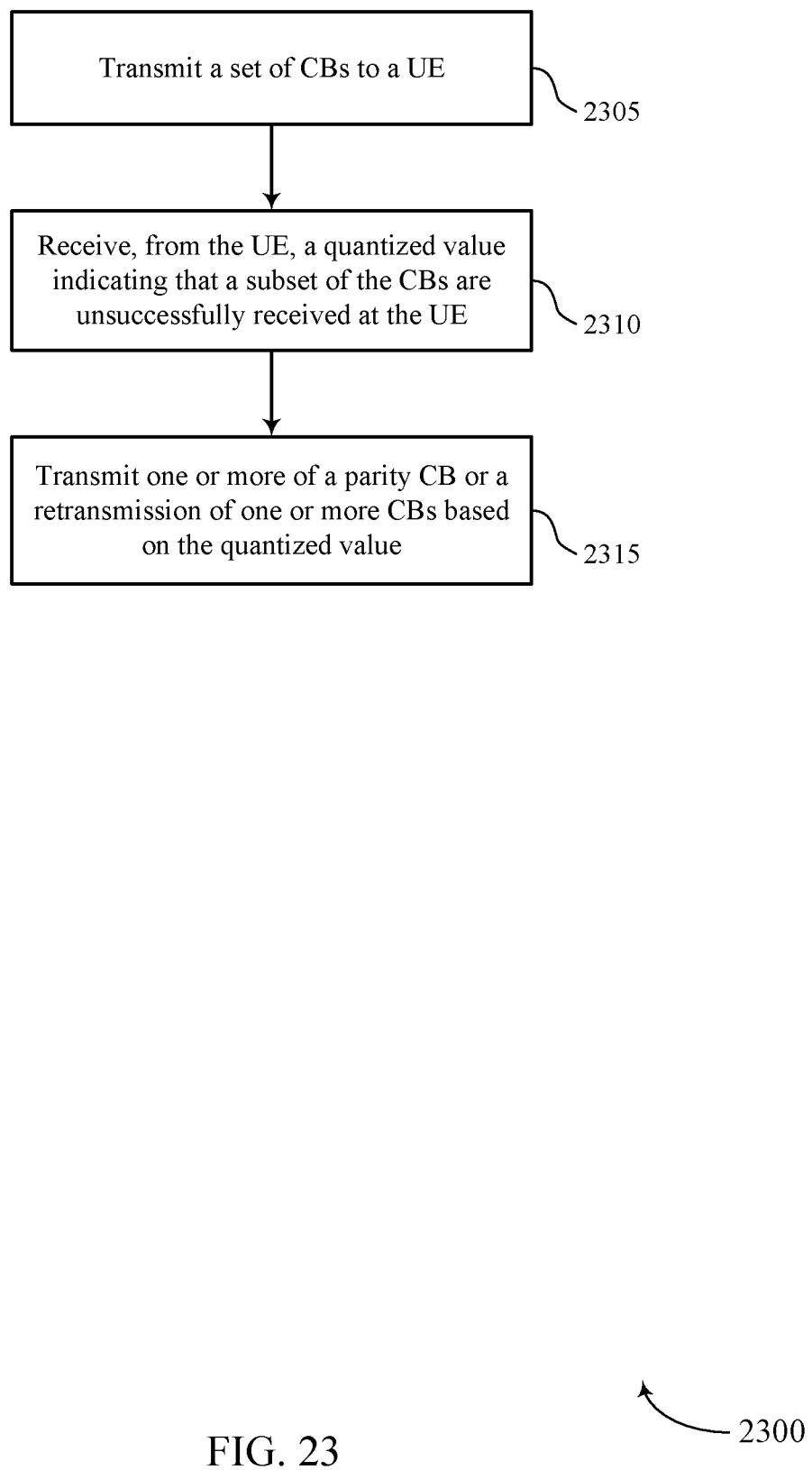

FIG. 23 shows a flowchart illustrating a method 2300 for feedback techniques for wireless communications in accordance with various aspects of the present disclosure. The operations of method 2300 may be implemented by a base station 105 or its components as described herein. For example, the operations of method 2300 may be performed by a base station coding manager as described with reference to FIGS. 13 through 16. In some examples, a base station 105 may execute a set of codes to control the functional elements of the device to perform the functions described below. Additionally or alternatively, the base station 105 may perform aspects of the functions described below using special-purpose hardware.

At block 2305 the base station 105 may transmit a plurality of CBs to a UE. The operations of block 2305 may be performed according to the methods described with reference to FIGS. 1 through 8. In certain examples, aspects of the operations of block 2305 may be performed by a encoding component as described with reference to FIGS. 13 through 16.

At block 2310 the base station 105 may receive, from the UE, a quantized value indicating that a subset of the CBs are unsuccessfully received at the UE. The operations of block 2310 may be performed according to the methods described with reference to FIGS. 1 through 8. In certain examples, aspects of the operations of block 2310 may be performed by a feedback manager as described with reference to FIGS. 13 through 16.

At block 2315 the base station 105 may transmit one or more of a CB or a retransmission of one or more CBs based at least in part on the quantized value. The operations of block 2315 may be performed according to the methods described with reference to FIGS. 1 through 8. In certain examples, aspects of the operations of block 2315 may be performed by an additional CB component as described with reference to FIGS. 13 through 16.

In some examples, aspects from two or more of methods 1700-2300 described with reference to FIGS. 17-23 may be combined. It should be noted that the methods described above describe possible implementations, and that the operations and the operations of the methods or the steps of the methods may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a geographic coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the geographic coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A, A-A-A, A-A-B, A-A-C, A-B-B, A-C-C, B-B, B-B-B, B-B-C, C-C, and C-C-C or any other ordering of A, B, and C).

Also, as used herein, the phrase "based on" shall not be construed as a reference to a closed set of conditions. For example, an exemplary step that is described as "based on condition A" may be based on both a condition A and a condition B without departing from the scope off the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving, from a transmitting device, a transmission comprising at least a portion of an encoded transportation block (TB), the TB comprising a plurality of code blocks (CBs);
   identifying a first subset of the plurality of CBs that are successfully received and a second subset of the plurality of CBs that are unsuccessfully received;
   identifying, based at least in part on a number of CBs in the second subset of the plurality of CBs that are unsuccessfully received, a quantization level from a set of quantization levels, each quantization level corresponding to a quantized value indicating a different number of CBs, wherein a number of quantization levels is configured through one or more of radio resource control (RRC) signaling or downlink control information (DCI) received from the transmitting device;
   determining, based at least in part on the identified quantization level, a quantized value associated with the second subset of the plurality of CBs that are unsuccessfully received, the quantized value indicating how many CBs are needed to decode the TB; and
   transmitting, to the transmitting device, the quantized value associated with the second subset of the plurality of CBs that are unsuccessfully received.

2. The method of claim 1, further comprising:
   transmitting a negative acknowledgment (NACK) for the TB when a number of CBs of the second subset of the plurality of CBs exceeds a threshold.

3. The method of claim 2, further comprising:
   receiving a retransmission of the TB responsive to the NACK for the TB.

4. The method of claim 1, further comprising:
   identifying the quantized value as a quantization level of two or more quantization levels, based at least in part on a number of CBs of the plurality of CBs.

5. The method of claim 4, wherein the identifying the two or more quantization levels further comprises:
   determining whether the quantized value is to be transmitted in an uplink common burst portion of a downlink-centric subframe or in an uplink-centric subframe; and
   identifying a first number of quantization levels associated with the uplink common burst portion of the downlink-centric subframe and a second number of quantization levels associated with the uplink-centric subframe.

6. The method of claim 5, wherein the transmitting the quantized value further comprises:
   selecting the first number of quantization levels or the second number of quantization levels based at least in part on the determining;
   selecting one of the first number of quantization levels as the quantized value based at least in part on a number of CBs in the second subset of the plurality of CBs when the first number of quantization levels is selected; and
   selecting one of the second number of quantization levels as the quantized value based at least in part on the number of CBs in the second subset of the plurality of CBs when the second number of quantization levels is selected.

7. The method of claim 4, wherein the identifying the two or more quantization levels comprises:
   determining an uplink channel for transmitting the quantized value; and
   identifying two or more quantization levels of the two or more quantization levels based at least in part on the uplink channel.

8. The method of claim 7, wherein the identifying the two or more quantization levels further comprises:
   determining that the uplink channel is an uplink control channel; and
   identifying the number of quantization levels based at least in part on a control channel format of the uplink control channel.

9. The method of claim 1, wherein the transmitting the quantized value comprises:
   comparing a number of CBs of the second subset of the plurality of CBs to a threshold value;
   transmitting a CB negative acknowledgment (NACK) when the number of CBs is below the threshold value to request one or more parity CB s for use in decoding the first subset of the plurality of CBs and the second subset of the plurality of CBs; and
   transmitting a TB NACK when the number of CBs is at or above the threshold value to request of retransmission of all of the plurality of CBs.

10. The method of claim 9, further comprising:
    receiving, responsive to the CB NACK, one or more additional CBs, and wherein a number of additional CBs is based at least in part on one or more retransmissions of one or more CBs of the second subset of the plurality of CBs.

11. The method of claim 9, further comprising:
    receiving, responsive to the TB NACK, a retransmission of an encoded TB that includes the plurality of CBs and the one or more parity CBs, and wherein a number of parity CBs included in the retransmission is indicated in one or more of RRC signaling or DCI associated with the retransmission.

12. A method for wireless communication, comprising:
transmitting at least a portion of an encoded transportation block (TB), the TB comprising a plurality of code blocks (CBs) to a user equipment (UE);
receiving, from the UE, a quantized value, the quantized value based at least in part on a quantization level, indicating that a subset of the plurality of CBs are unsuccessfully received at the UE, wherein the quantization level is determined from a set of quantization levels, each quantization level corresponding to a quantized value indicating a number of CBs and the quantized value indicates how many CBs are needed to decode the TB and wherein a number of quantization levels is configured at the UE through one or more of radio resource control (RRC) signaling or downlink control information (DCI); and
transmitting one or more additional CBs based at least in part on the quantized value.

13. The method of claim 12, further comprising:
receiving, from the UE, a negative acknowledgment (NACK) for the TB that indicates a number of CBs of the subset of the plurality of CBs exceeds a threshold.

14. The method of claim 13, further comprising:
transmitting a retransmission of the TB responsive to the NACK for the TB.

15. The method of claim 12, further comprising:
configuring the UE with two or more quantization levels for the quantized value based at least in part on a number of CBs of the plurality of CBs.

16. The method of claim 15, wherein the two or more quantization levels are based at least in part on one or more of:
an uplink transmission used for transmitting the quantized value;
an uplink channel for transmitting the quantized value; or
a control channel format of an uplink control channel for transmitting the quantized value.

17. The method of claim 12, further comprising:
determining that the quantized value indicates a CB negative acknowledgment (NACK); and
transmitting, responsive to the CB NACK, one or more CBs, and wherein a number of the CBs is based at least in part on one or more retransmissions of one or more CBs of the subset of the CBs.

18. The method of claim 12, further comprising:
determining that the quantized value indicates a TB negative acknowledgment (NACK); and
transmitting, responsive to the TB NACK, a retransmission of an encoded TB that includes the plurality of CBs and one or more parity CBs, and wherein a number of parity CBs included in the retransmission is indicated in one or more of RRC signaling or DCI associated with the retransmission.

19. An apparatus for wireless communication, comprising:
means for receiving, from a transmitting device, a transmission comprising at least a portion of an encoded transportation block (TB), the TB comprising a plurality of code blocks (CBs);
means for identifying a first subset of the plurality of CBs that are successfully received and a second subset of the plurality of CBs that are unsuccessfully received;
means for identifying, based at least in part on a number of CBs in the second subset of the CBs that are unsuccessfully received, a quantization level from a set of quantization levels, each quantization level corresponding to a quantized value indicating a different number of CBs,
wherein a number of quantization levels is configured through one or more of radio resource control (RRC) signaling or downlink control information (DCI) received from the transmitting device;
means for determining, based at least in part on the identified quantization level, a quantized value associated with the second subset of the plurality of CBs that are unsuccessfully received, the quantized value indicating how many CBs are needed to decode the TB; and
means for transmitting, to the transmitting device, the quantized value associated with the second subset of the plurality of CBs that are unsuccessfully received.

20. An apparatus for wireless communication, comprising:
means for transmitting at least a portion of an encoded transportation block (TB), the TB comprising a plurality of code blocks (CBs) to a UE;
means for receiving, from the UE, a quantized value, the quantized value based at least in part on a quantization level, indicating that a subset of the CBs are unsuccessfully received at the UE, wherein the quantization level is determined from a set of quantization levels, each quantization level corresponding to a quantized value indicating a number of CBs and the quantized value indicates how many CBs are needed to decode the TB and wherein a number of quantization levels is configured at the UE through one or more of radio resource control (RRC) signaling or downlink control information (DCI); and
means for transmitting one or more additional CB or a retransmission of one or more CB s based at least in part on the quantized value.

21. An apparatus for wireless communication, in a system comprising:
a processor;
memory in electronic communication with the processor; and
instructions stored in the memory and operable, when executed by the processor, to cause the apparatus to:
receive, from a transmitting device, a transmission comprising at least a portion of, an encoded transportation block (TB), the TB comprising a plurality of code blocks (CBs);
identify a first subset of the plurality of CBs that are successfully received and a second subset of the plurality of CBs that are unsuccessfully received;
identify, based at least in part on a number of CBs in the second subset of the plurality of CBs that are unsuccessfully received, a quantization level from a set of quantization levels, each quantization level corresponding to a quantized value indicating a different number of CBs, wherein a number of quantization levels is configured through one or more of radio resource control (RRC) signaling or downlink control information (DCI) received from the transmitting device;
determine, based at least in part on the identified quantization level, a quantized value associated with the second subset of the plurality of CBs that are unsuccessfully received, the quantized value indicating how many CBs are needed to decode the TB; and
transmit, to the transmitting device, a quantized value associated with the second subset of the plurality of CBs that are unsuccessfully received.

22. An apparatus for wireless communication, in a system comprising:
- a processor;
- memory in electronic communication with the processor; and
- instructions stored in the memory and operable, when executed by the processor, to cause the apparatus to:
  - transmit at least a portion of an encoded transportation block (TB), the TB comprising a plurality of code blocks (CBs) to a UE;
  - receive, from the UE, a quantized value, the quantized value based at least in part on a quantization level, indicating that a subset of the CBs are unsuccessfully received at the UE, wherein the quantization level is determined from a set of quantization levels, each quantization level corresponding to a quantized value indicating a number of CBs and the quantized value indicates how many CBs are needed to decode the TB and wherein a number of quantization levels is configured at the UE through one or more of radio resource control (RRC) signaling or downlink control information (DCI).

23. A non-transitory computer readable medium storing code for wireless communication, the code comprising instructions executable by a processor to:
- receive, from a transmitting device, a transmission comprising at least a portion of an encoded transportation block (TB), the TB comprising a plurality of code blocks (CBs);
- identify a first subset of the plurality of CBs that are successfully received and a second subset of the plurality of CBs that are unsuccessfully received;
- identify, based at least in part on a number of CBs in the second subset of the plurality of CBs that are unsuccessfully received, a quantization level from a set of quantization levels, each quantization level corresponding to a quantized value indicating a different number of CBs, wherein a number of quantization levels is configured through one or more of radio resource control (RRC) signaling or downlink control information (DCI) received from the transmitting device;
- determine, based at least in part on the identified quantization level, a quantized value associated with the second subset of the plurality of CBs that are unsuccessfully received, the quantized value indicating how many CBs are needed to decode the TB; and
- transmit, to the transmitting device, a quantized value associated with the second subset of the plurality of CBs that are unsuccessfully received.

24. A non-transitory computer readable medium storing code for wireless communication, the code comprising instructions executable by a processor to:
- transmit at least a portion of an encoded transportation block (TB), the TB comprising a plurality of code blocks (CBs) to a UE;
- receive, from the UE, a quantized value, the quantized value based at least in part on a quantization level, indicating that a subset of the CBs are unsuccessfully received at the UE, wherein the quantization level is determined from a set of quantization levels, each quantization level corresponding to a quantized value indicating a number of CBs and wherein a number of quantization levels is configured at the UE through one or more of radio resource control (RRC) signaling or downlink control information (DCI); and
- transmit one or more additional CBs or a retransmission of one or more CBs based at least in part on the quantized value, wherein a number of the one or more additional CBs is a portion of the subset of the CBs that are unsuccessfully received by the UE and the quantized value indicates how many CB s are needed to decode the TB.

* * * * *